United States Patent
Wang et al.

(10) Patent No.: US 9,930,342 B2
(45) Date of Patent: Mar. 27, 2018

(54) SYSTEMS AND METHODS FOR SIGNALING HYPOTHETICAL REFERENCE DECODER PARAMETERS IN A PARAMETER SET

(71) Applicant: QUALCOMM Incorporated, San Diego, CA (US)

(72) Inventors: Ye-Kui Wang, San Diego, CA (US); Fnu Hendry, Poway, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 14/743,556

(22) Filed: Jun. 18, 2015

(65) Prior Publication Data
US 2015/0373375 A1    Dec. 24, 2015

Related U.S. Application Data

(60) Provisional application No. 62/015,285, filed on Jun. 20, 2014.

(51) Int. Cl.
| | |
|---|---|
| *H04N 19/70* | (2014.01) |
| *H04N 19/146* | (2014.01) |
| *H04N 19/44* | (2014.01) |
| *H04N 19/184* | (2014.01) |
| *H04N 19/30* | (2014.01) |
| *H04N 19/46* | (2014.01) |
| *H04N 19/513* | (2014.01) |

(Continued)

(52) U.S. Cl.
CPC ......... *H04N 19/146* (2014.11); *H04N 19/184* (2014.11); *H04N 19/30* (2014.11); *H04N 19/44* (2014.11); *H04N 19/46* (2014.11); *H04N 19/463* (2014.11); *H04N 19/513* (2014.11); *H04N 19/597* (2014.11); *H04N 19/70* (2014.11)

(58) Field of Classification Search
CPC .................................................... H04N 19/146
See application file for complete search history.

(56) References Cited

U.S. PATENT DOCUMENTS

| | | |
|---|---|---|
| 9,172,963 B2 | 10/2015 | Wang et al. |
| 2014/0092978 A1 | 4/2014 | Bugdayci et al. |

(Continued)

OTHER PUBLICATIONS

Flynn et al. "HEVC Range Extensions text specification: Draft 7"; Mar. 27, 2014-Apr. 4, 2014; Valencia, Spain.*

(Continued)

*Primary Examiner* — Jonathan Messmore

(57) ABSTRACT

Techniques and systems are provided for encoding and decoding video data. For example, a method of encoding video data includes generating an encoded video bitstream comprising multiple layers. The encoded video bitstream includes a video parameter set defining parameters of the encoded video bitstream. The video parameter set includes video usability information. The method further includes determining whether timing information is signaled in the video usability information of the video parameter set. The method further includes determining whether to signal hypothetical reference decoder parameters in the video usability information of the video parameter set based on whether timing information is signaled in the video usability information.

30 Claims, 18 Drawing Sheets

US 9,930,342 B2

Page 2

(51) Int. Cl.
*H04N 19/597* (2014.01)
*H04N 19/463* (2014.01)

(56) References Cited

U.S. PATENT DOCUMENTS

| | | | |
|---|---|---|---|
| 2014/0301476 | A1 | 10/2014 | Deshpande et al. |
| 2015/0049806 | A1 | 2/2015 | Choi et al. |
| 2015/0256856 | A1 | 9/2015 | Tsukuba et al. |
| 2015/0264099 | A1* | 9/2015 | Deshpande ........... H04L 65/607 709/219 |
| 2015/0341636 | A1 | 11/2015 | Tsai et al. |
| 2015/0373337 | A1 | 12/2015 | Wang |
| 2015/0373376 | A1 | 12/2015 | Wang |
| 2015/0381999 | A1 | 12/2015 | Chuang et al. |
| 2016/0057441 | A1 | 2/2016 | Skupin et al. |
| 2016/0134895 | A1 | 5/2016 | Suehring et al. |
| 2016/0227227 | A1 | 8/2016 | Deshpande |
| 2016/0261878 | A1 | 9/2016 | Deshpande |

OTHER PUBLICATIONS

Fynn et al., "High Efficiency Video Coding (HEVC) Range Extensions text specification: Draft 7," 17.JCT-VC Meeting; Mar. 27, 2014-Apr. 4, 2014; Valencia, ES; JCT-VC of ITU-T SG WP 3 and ISO/IEC JTC 1/SC 29/WG 11; URL: http://WFTP3.1TU.INT/AV-ARCH/JCRVC-SITE/, pp. 1-363.*
Chen J., et al., "High Efficiency Video Coding (HEVC) Scalable Extension Draft 6," 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL:http://wftp3.itu.int/av-arch/jctvc-site/, No. JCTVC-Q1008, Apr. 15, 2014, XP030116232.
Hannuksela M.M., "MV-HEVC/SHVC HLS: On Additional Layer Sets, Rewriting of Simulcast Layers, and Profile-Tier-Level Indication for Auxiliary Picture Layers", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctv-site/, No. JCTVC-Q0078-v4, Apr. 4, 2014 (Apr. 4, 2014), pp. 1-7, XP030115980.
Wang Y-K., et al., "AHG10 Output Text," Joint Collaborative Team on Video Coding (JCT-VC) of ITU-T SG 16 WP 3 and ISO/IEC JTC 1, vol. JCTVC-R0010v1-JCT3V-10010v1, Jun. 14, 2014, XP055209600.
Chen J., et al., "High efficiency video coding (HEVC) scalable extension Draft 6", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ), 64 pages.
Chen, J., et al., "High efficiency video coding (HEVC) scalable extensions Draft 5", 16. JCT-VC Meeting; Jan. 9-17, 2014, San Jose; (Joint Collaborative Team on Video Coding of ISO/IEC JTC1/SC29/WG11 and ITU-T SG.16), 125 pages.
Choi, B., et al., "MV-HEVC/SHVC HLS: Decoded picture buffer signalling", 7. JCT-3V Meeting; Jan. 9-17, 2014, San Jose; (The Joint Collaborative Team 3D Video Coding Extension Development of ISO/IEC JTC1/SC29/WG11 and ITU-T SG.16 ), 12 pages.
Flynn, D., et al., "High Efficiency Video Coding (HEVC) Range Extensions text specification: Draft 7", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ), 345 pages.

Hannuksela, M M: "AHG10: Profile indication for additional layer sets", 18. JCT-VC Meeting; Jun. 30, 2014-Jul. 9, 2014; SAPPRO; (Joint Collaborative Team on Video Coding of ISO/IEC JTC1/SC29/WG11 ITU-T SG.16, 8 pages.
International Search Report and Written Opinion—PCT/US2015/036613—ISA/EPO—dated Sep. 16, 2015.
Tech, G., et al., "Preliminary Draft of ISO/IEC 23008-2:2013/FDAM2 HEVC Multiview Extensions, v2", 108. MPEG Meeting; Mar. 29, 2014-Apr. 4, 2014; Valencia; (Motion Picture Expert Group or ISO/IEC JTC1/SC29/WG11), 164 pages.
Tech, G., et al., "MV-HEVC Draft Text 8", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ), 163 pages.
Tsukuba, T., et al., "MV-HEVC/SHVC HLS: Clean up for output layer set", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ), 8 pages.
Wang, Y K., et al., "MV-HEVC/SHVC HLS: Miscellaneous cleanups", 18. JCT-VC Meeting; Jun. 30, 2014-Jul. 9, 2014; Sappro; (Joint Collaborative Team on Video Coding of ISO/IEC JTC1/SC29/WG11 and ITU-T SG.16 ), 8 pages.
Boyce J., et al., "Draft High Efficiency Video Coding (HEVC) Version 2, Combined Format Range Extensions (RExt), Scalability (SHVC), and Multi-view (MV-HEVC) Extensions", Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014, Document: JCTVC-R1013_v6, pp. 1-514.
Ribas-Corbera, J., et al., "A Generalized Hypothetical Reference Decoder for H.264/AVC", IEEE Transactions on Circuits and Systems for Video Technology, vol. 13, No. 7, Jul. 2003, pp. 674-687.
Deshpande, S., et al., "An Improved Hypothetical Reference Decoder for HEVC," Proc. SPIE 8666, Visual Information Processing and Communication IV, Feb. 21, 2013, pp. 866608-1 to 866608-9, vol. 8666.
Sjoberg, R., et al., "Overview of HEVC High-Level Syntax and Reference Picture Management," IEEE Transactions on Circuits and Systems for Video Technology, vol. 22, No. 12, Dec. 2012, pp. 1858-1870.
Sullivan, G.J., et al., "Overview of the High Efficiency Video Coding (HEVC) Standard," IEEE Transactions on Circuits and Systems for Video Technology, vol. 22, No. 12, Dec. 1, 2012, pp. 1649-1668.
Wien, M, "High Efficiency Video Coding", Coding Tools and Specification, Chapter 12, 2015, pp. 291-308.
Wien, M, "High Efficiency Video Coding", Coding Tools and Specification, Chapter 5, 2015, pp. 133-160.
Jianle C., et al., "High efficiency video coding (HEVC) scalable extensions Draft 5," Joint Collaborative Team on Video Coding (JCT-VC) of ITU-T SG 16 WP 3 and ISO/IEC JTC 1/SC 29/WG 11, 16th Meeting: San Jose, US, JCTVC-P1 008_v4, Jan. 2014, pp. 125 pages.
Miska H., et al., "AHG10: Profile indication for additional layer sets," Joint Collaborative Team on Video Coding (JCT-VC) of ITU-T SG 16 WP 3 and ISO/IEC JTC 1 /SC 29/WG11, 18th Meeting: Sapporo, JP, JCTVC-R0042r21, Jun. 22, 2017, pp. 8 pages.

* cited by examiner

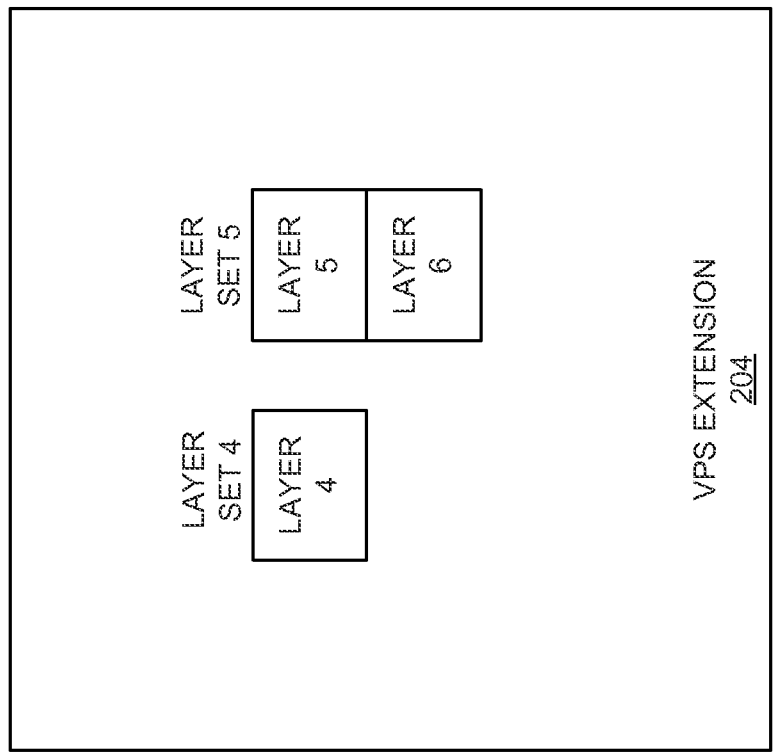
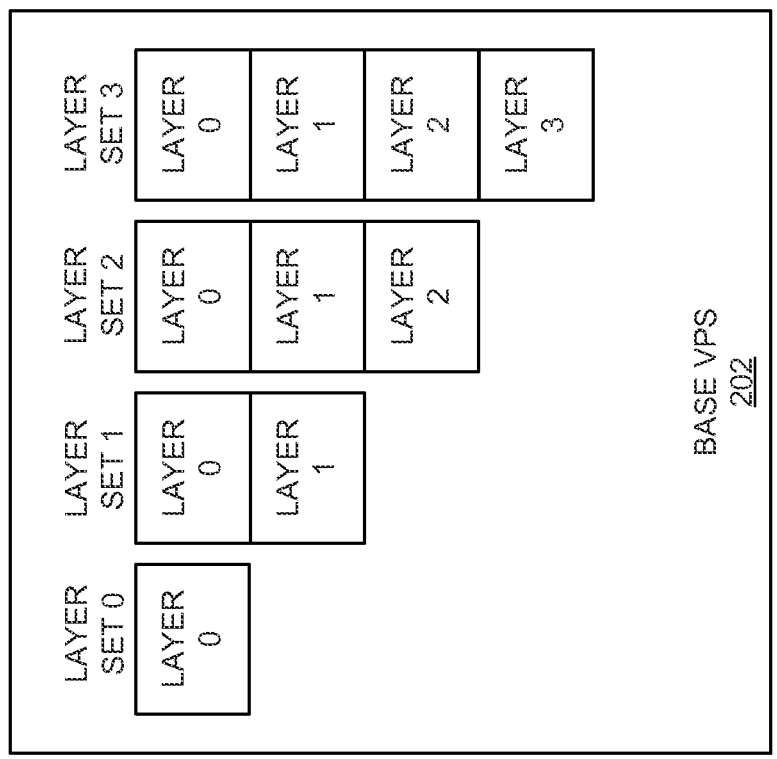
FIG. 2

| | Descriptor |
|---|---|
| vps_extension( ) { | |
| ... | |
|   NumOutputLayerSets = num_add_olss + NumLayerSets | |
|   for( i = 1; i < NumOutputLayerSets; i++ ) { | |
|     if( i >= NumLayerSets ) | |
|       layer_set_idx_for_ols_minus1[ i ] | u(v) |
|     if( i > vps_num_layer_sets_minus1 \|\| defaultOutputLayerIdc == 2 ) | |
|       for( j = 0; j < NumLayersInIdList[ OlsIdxToLsIdx[ i ] ]; j++ ) | |
|         output_layer_flag[ i ][ j ] | u(1) |
|     profile_level_tier_idx[ i ] | u(v) |
|     if( NumOutputLayersInOutputLayerSet[ i ] == 1<br>      && NumDirectRefLayers[ OlsHighestOutputLayerId[ i ] ] > 0 ) | |
|       alt_output_layer_flag[ i ] | u(1) |
|   ... | |
| ... | |

| vps_extension() { | | Descriptor |
|---|---|---|
| ... | | |
| NumOutputLayerSets = num_add_olss + NumLayerSets | | |
| for( i = 1; i < NumOutputLayerSets; i++ ) { | | |
|   if( i >= NumLayerSets ) | | |
|     layer_set_idx_for_ols_minus1[ i ] | | u(v) |
|   if( i >= NumLayerSets \| defaultOutputLayerIdc == 2 ) | | |
|     for( j=0; j < NumLayersInIdList[ OlsIdxToLsIdx[ i ] ]; j++ ) | | |
|       output_layer_flag[ i ][ j ] | | u(1) |
|   profile_level_tier_idx[ i ] | | u(v) |
|   if( NumOutputLayersInOutputLayerSet[ i ] == 1 <br>   && NumDirectRefLayers[ OlsHighestOutputLayerId[ i ] ] > 0 ) | | |
|     alt_output_layer_flag[ i ] | | u(1) |
| ... | | |

| vps_vui( ) { | Descriptor |
|---|---|
| ... | |
| bit_rate_present_vps_flag | u(1) |
| pic_rate_present_vps_flag | u(1) |
|   if( bit_rate_present_vps_flag \|\| pic_rate_present_vps_flag )   —516 | |
|     for( i = vps_base_layer_internal_flag ? 0 : 1; i <= vps_num_layer_sets_minus1; i++) | |
|       for( j = 0; j <= MaxSubLayersInLayerSetMinus1[ i ]; j++ ) { | |
|         if( bit_rate_present_vps_flag ) | |
|           bit_rate_present_flag[ i ][ j ] | u(1) |
|         if( pic_rate_present_vps_flag) | |
|           pic_rate_present_flag[ i ][ j ] | u(1) |
|         if( bit_rate_present_flag[ i ][ j ] ) { | |
|           avg_bit_rate[ i ][ j ] | u(16) |
|           max_bit_rate[ i ][ j ] | u(16) |
|         } | |
|         if( pic_rate_present_flag[ i ][ j ] ) { | |
|           constant_pic_rate_idc[ i ][ j ] | u(2) |
|           avg_pic_rate[ i ][ j ] | u(16) |
|         } | |
|       } | |
| video_signal_info_idx_present_flag | u(1) |
|   if( video_signal_info_idx_present_flag ) | |
|     vps_num_video_signal_info_minus1 | u(4) |
|   for( i = 0; i <= vps_num_video_signal_info_minus1; i++ ) | |
|     video_signal_info( ) | |
|   if( video_signal_info_idx_present_flag && vps_num_video_signal_info_minus1 > 0 ) | |
|     for( i = 1; i <= MaxLayersMinus1; i++ ) | |
|       vps_video_signal_info_idx[ i ] | u(4) |
| ... | |

| vps_vui( ) { | Descriptor |
|---|---|
| ... | |
|    bit_rate_present_vps_flag | u(1) |
|    pic_rate_present_vps_flag | u(1) |
|    if( bit_rate_present_vps_flag || pic_rate_present_vps_flag ) /*616*/ | |
|      for( i = vps_base_layer_internal_flag ? 0 : 1; i < NumLayerSets; i++ ) | |
|       for( j = 0; j <= MaxSubLayersInLayerSetMinus1[ i ]; j++ ) { | |
|        if( bit_rate_present_vps_flag ) | |
|         bit_rate_present_flag[ i ][ j ] | u(1) |
|        if( pic_rate_present_vps_flag ) | |
|         pic_rate_present_flag[ i ][ j ] | u(1) |
|        if( bit_rate_present_flag[ i ][ j ] ) { | |
|         avg_bit_rate[ i ][ j ] | u(16) |
|         max_bit_rate[ i ][ j ] | u(16) |
|        } | |
|        if( pic_rate_present_flag[ i ][ j ] ) { | |
|         constant_pic_rate_idc[ i ][ j ] | u(2) |
|         avg_pic_rate[ i ][ j ] | u(16) |
|        } | |
|       } | |
|    video_signal_info_idx_present_flag | u(1) |
|    if( video_signal_info_idx_present_flag ) | |
|      vps_num_video_signal_info_minus1 | u(4) |
|    for( i = 0; i <= vps_num_video_signal_info_minus1; i++ ) | |
|      video_signal_info( ) | |
|    if( video_signal_info_idx_present_flag && vps_num_video_signal_info_minus1 > 0 ) | |
|      for( i = 1; i <= MaxLayersMinus1; i++ ) | |
|       vps_video_signal_info_idx[ i ] | u(4) |
| ... | |

FIG. 6

| | Descriptor |
|---|---|
| vps_vui() { | |
| ... | |
| video_signal_info_idx_present_flag | u(1) |
| if( video_signal_info_idx_present_flag ) | |
|    vps_num_video_signal_info_minus1 | u(4) |
| for( i = 0; i <= vps_num_video_signal_info_minus1; i++ ) | |
|    video_signal_info() | |
| if( video_signal_info_idx_present_flag && vps_num_video_signal_info_minus1 > 0 ) | |
|    for( i = 1; i <= MaxLayersMinus1; i++ ) | |
|       vps_video_signal_info_idx[ i ] | u(4) |
| ... | |
| if( vps_timing_info_present_flag ) | |
|    vps_vui_bsp_hrd_present_flag | u(1) |
| if( vps_vui_bsp_hrd_present_flag ) | |
|    vps_vui_bsp_hrd_parameters() | |
| for( i = 1; i <= MaxLayersMinus1; i++ ) | |
|    if( NumDirectRefLayers[ layer_id_in_nuh[ i ] ] == 0 ) | |
|       base_layer_parameter_set_compatibility_flag[ i ] | u(1) |
| } | |

FIG. 9A

| 905 | Descriptor |
|---|---|
| vps_vui() { | |
| ... | |
| video_signal_info_idx_present_flag | u(1) |
| if( video_signal_info_idx_present_flag ) | |
|    vps_num_video_signal_info_minus1 | u(4) |
| for( i = 0; i <= vps_num_video_signal_info_minus1; i++ ) | |
|    video_signal_info() | |
| if( video_signal_info_idx_present_flag && vps_num_video_signal_info_minus1 > 0 ) | |
|    for( i = 1; i <= MaxLayersMinus1; i++ ) | |
|       vps_video_signal_info_idx[ i ] | u(4) |
| ... | |
| vps_vui_bsp_hrd_present_flag | u(1) |
| if( vps_vui_bsp_hrd_present_flag ) | |
|    vps_vui_bsp_hrd_parameters() | |
| for( i = 1; i <= MaxLayersMinus1; i++ ) | |
|    if( NumDirectRefLayers[ layer_id_in_nuh[ i ] ] == 0 ) | |
|       base_layer_parameter_set_compatibility_flag[ i ] | u(1) |
| ... | |

SYSTEMS AND METHODS FOR SIGNALING HYPOTHETICAL REFERENCE DECODER PARAMETERS IN A PARAMETER SET

CROSS-REFERENCE TO RELATED APPLICATIONS

This application claims the benefit of U.S. Provisional Application No. 62/015,285, filed Jun. 20, 2014, which is hereby incorporated by reference, in its entirety. This application is related to U.S. application Ser. No. 14/743,434, titled "SYSTEMS AND METHODS FOR SIGNALING INFORMATION FOR LAYER SETS IN A PARAMETER SET," filed on the same date herewith, and U.S. application Ser. No. 14/743,613, titled "SYSTEMS AND METHODS FOR SELECTIVELY SIGNALING DIFFERENT NUMBERS OF VIDEO SIGNAL INFORMATION SYNTAX STRUCTURES IN A PARAMETER SET," filed on the same date herewith, both of which are hereby incorporated herein by reference, in their entirety.

FIELD

The present disclosure generally relates to video coding, and more specifically to techniques and systems for signaling hypothetical reference decoder parameters in a parameter set.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some embodiments, techniques and systems are described for signaling information for layer sets in a parameter set. A layer set includes a set of layers of a bitstream that are self-contained so that the layers in a given layer set can form an independent bitstream representing video content. The parameter set may include a video parameter set. The parameter set may be provided with an encoded video bitstream and may define parameters of the encoded video bitstream. One or more layer sets may be defined in a base part of the parameter set, and one or more additional layer sets not defined in the base part may be defined in an extension part of the parameter set. The base part of the parameter set may be defined in an initial edition of a video coding standard (e.g., a first edition of the high efficiency video coding standard, or other coding standard), and the extension part of the parameter set may be defined in a later edition of the video coding standard. The base and extension parts of the parameter set may include signaling information describing characteristics of one or more layer sets (including the additional layer sets). For example, the signaling information may describe rate information (e.g., bit rate information, picture rate information, or other rate information) for the one or more layer sets (including the additional layer sets). In another example, the signaling information may include information indicating whether a layer in a layer set is a target output layer of an output layer set. Embodiments are described herein for signaling such information for all layer sets defined in the base and extension parts of the parameter set.

According to at least one example of for signaling information in a parameter set for layer sets, a method of encoding video data is provided that includes generating an encoded video bitstream with one or more layer sets and one or more additional layer sets. Each of a layer set and an additional layer set includes one or more layers, and the encoded video bitstream includes a video parameter set defining parameters of the encoded video bitstream. The one or more layer sets are defined in a base part of the video parameter set, and the one or more additional layer sets are defined in an extension part of the video parameter set. The method further includes providing, in the video parameter set, one or more syntax elements for signaling information related to the one or more layer sets and the one or more additional layer sets. The information includes rate information for the one or more layer sets defined in the base part of the video parameter set and for the one or more additional layer sets defined in the extension part of the video parameter set.

In another example, an apparatus is provided that includes a memory configured to store video data and a processor. The processor is configured to and may generate, from the video data, an encoded video bitstream comprising one or more layer sets and one or more additional layer sets. Each of a layer set and an additional layer set includes one or more layers, and the encoded video bitstream includes a video parameter set defining parameters of the encoded video bitstream. The one or more layer sets are defined in a base part of the video parameter set, and the one or more additional layer sets are defined in an extension part of the video parameter set. The processor is further configured to and may provide, in the video parameter set, one or more syntax elements for signaling information related to the one or more layer sets and the one or more additional layer sets. The information includes rate information for the one or more layer sets defined in the base part of the video parameter set and for the one or more additional layer sets defined in the extension part of the video parameter set.

In another example, a computer readable medium is provided having stored thereon instructions that when executed by a processor perform a method that includes: generating an encoded video bitstream comprising one or more layer sets and one or more additional layer sets, wherein each of a layer set and an additional layer set includes one or more layers, the encoded video bitstream including a video parameter set defining parameters of the encoded video bitstream, wherein the one or more layer sets are defined in a base part of the video parameter set, and wherein the one or more additional layer sets are defined in an extension part of the video parameter set; and providing, in the video parameter set, one or more syntax elements for signaling information related to the one or more layer sets and the one or more additional layer sets, the information including rate information for the one or more layer sets defined in the base part of the video parameter set and for the one or more additional layer sets defined in the extension part of the video parameter set.

In another example, an apparatus is provided that includes means for generating an encoded video bitstream comprising one or more layer sets and one or more additional layer sets. Each of a layer set and an additional layer set includes one or more layers, and the encoded video bitstream includes a video parameter set defining parameters of the encoded video bitstream. The one or more layer sets are defined in a base part of the video parameter set, and the one or more additional layer sets are defined in an extension part of the video parameter set. The apparatus further includes means for providing, in the video parameter set, one or more syntax elements for signaling information related to the one or more layer sets and the one or more additional layer sets. The information includes rate information for the one or more layer sets defined in the base part of the video parameter set and for the one or more additional layer sets defined in the extension part of the video parameter set.

In another example of signaling information for layer sets in a parameter set, a method of decoding video data is provided that includes obtaining an encoded video bitstream comprising one or more layer sets and one or more additional layer sets. Each of a layer set and an additional layer set includes one or more layers, and the encoded video bitstream includes a video parameter set defining parameters of the encoded video bitstream. The one or more layer sets are defined in a base part of the video parameter set, and the one or more additional layer sets are defined in an extension part of the video parameter set. The method further includes decoding one or more syntax elements from the video parameter set. The one or more syntax elements include rate information for the one or more layer sets defined in the base part of the video parameter set and for the one or more additional layer sets defined in the extension part of the video parameter set.

In another example, an apparatus is provided that includes a memory configured to store video data and a processor. The processor is configured to and may obtain an encoded video bitstream comprising one or more layer sets and one or more additional layer sets. Each of a layer set and an additional layer set includes one or more layers, and the encoded video bitstream includes a video parameter set defining parameters of the encoded video bitstream. The one or more layer sets are defined in a base part of the video parameter set, and the one or more additional layer sets are defined in an extension part of the video parameter set. The processor is further configured to and may decode one or more syntax elements from the video parameter set. The one or more syntax elements include rate information for the one or more layer sets defined in the base part of the video parameter set and for the one or more additional layer sets defined in the extension part of the video parameter set.

In another example, a computer readable medium is provided having stored thereon instructions that when executed by a processor perform a method that includes: obtaining an encoded video bitstream comprising one or more layer sets and one or more additional layer sets, wherein each of a layer set and an additional layer set includes one or more layers, the encoded video bitstream including a video parameter set defining parameters of the encoded video bitstream, wherein the one or more layer sets are defined in a base part of the video parameter set, and wherein the one or more additional layer sets are defined in an extension part of the video parameter set; and decoding one or more syntax elements from the video parameter set, the one or more syntax elements including rate information for the one or more layer sets defined in the base part of the video parameter set and for the one or more additional layer sets defined in the extension part of the video parameter set.

In another example, an apparatus is provided that includes means for obtaining an encoded video bitstream comprising one or more layer sets and one or more additional layer sets. Each of a layer set and an additional layer set includes one or more layers, and the encoded video bitstream includes a video parameter set defining parameters of the encoded video bitstream. The one or more layer sets are defined in a base part of the video parameter set, and the one or more additional layer sets are defined in an extension part of the video parameter set. The apparatus further includes means for one or more syntax elements from the video parameter set. The one or more syntax elements include rate information for the one or more layer sets defined in the base part of the video parameter set and for the one or more additional layer sets defined in the extension part of the video parameter set.

In some aspects, different rate information is signaled for each different layer set of the one or more layer sets and the one or more additional layer sets. In some aspects, the rate information includes bit rate information. In some aspects, the rate information includes picture rate information.

In some aspects, the one or more syntax elements in the video parameter set include a flag, the flag indicating whether bit rate information is available for an additional layer set. In some aspects, the one or more syntax elements in the video parameter set include a flag, the flag indicating whether picture rate information is available for an additional layer set. In some aspects, the one or more syntax elements in the video parameter set include a syntax element, the syntax element indicating an average bit rate for an additional layer set. In some examples, the one or more syntax elements in the video parameter set include a syntax element, the syntax element indicating a maximum bit rate for an additional layer set.

In some aspects, the one or more syntax elements in the video parameter set include a syntax element, the syntax element indicating whether an additional layer set has a constant picture rate. In some aspects, the one or more syntax elements in the video parameter set include a syntax element, the syntax element indicating an average picture rate for an additional layer set. In some aspects, the one or more syntax elements in the video parameter set include a flag, the flag indicating whether a layer in an additional layer set is a target output layer of an output layer set.

In some embodiments, techniques and systems are described for signaling hypothetical reference decoder (HRD) parameters in a parameter set in only certain conditions. In some examples, sets of hypothetical reference decoder parameters may be provided in a parameter set and used to check that a bitstream or a sub-bitstream can be properly decoded. For example, the hypothetical reference decoder parameters may be signaled in a video usability information (VUI) part of a video parameter set (VPS), or the VPS VUI. The signaling of the hypothetical reference decoder parameters in the VPS VUI may be controlled by a gating flag. For example, hypothetical reference decoder parameters may not be signaled in the VPS VUI when a value of the gating flag is set to 0 in some examples, or 1 in other examples. Embodiments are described herein for signaling hypothetical reference decoder parameters in the VPS VUI when certain information is signaled in the VPS or the VPS VUI. For example, hypothetical reference decoder parameters may be signaled in the VPS VUI when timing information is also signaled in the VPS or the VPS VUI. Similarly, hypothetical reference decoder parameters may not be signaled in the VPS VUI when no timing information is signaled in the VPS or the VPS VUI. In some aspects, an encoder (or other device, such as an editor, splicer, or the like) may condition the value of the gating flag to be dependent on a value of a syntax element that indicates whether timing information is present in the VPS or the VPS VUI. For example, when the syntax element is set to a value (e.g., 0 or 1) indicating that no timing information is present, the gating flag may not be signaled and thus inferred to be a certain value indicating that no hypothetical reference decoder parameters are to be signaled. In another example when the syntax element is set to a value indicating that no timing information is present, the gating flag may be signaled with the flag set to the certain value.

According to at least one example of signaling hypothetical reference decoder parameters in a parameter set, a method of encoding video data is provided that includes generating an encoded video bitstream comprising multiple layers. The encoded video bitstream includes a video parameter set defining parameters of the encoded video bitstream. The video parameter set includes video usability information. The method further includes determining whether timing information is signaled in the video usability information of the video parameter set. The method further includes determining whether to signal hypothetical reference decoder parameters in the video usability information of the video parameter set based on whether timing information is signaled in the video usability information In another example, an apparatus is provided that includes a memory configured to store video data and a processor. The processor is configured to and may generate, from the video data, an encoded video bitstream comprising multiple layers. The encoded video bitstream includes a video parameter set defining parameters of the encoded video bitstream. The video parameter set includes video usability information. The processor is further configured to and may determine whether timing information is signaled in the video usability information of the video parameter set. The processor is further configured to and may determine whether to signal hypothetical reference decoder parameters in the video usability information of the video parameter set based on whether timing information is signaled in the video usability information.

In another example, a computer readable medium is provided having stored thereon instructions that when executed by a processor perform a method that includes: generating an encoded video bitstream comprising multiple layers, the encoded video bitstream including a video parameter set defining parameters of the encoded video bitstream, wherein the video parameter set includes video usability information; determining whether timing information is signaled in the video usability information of the video parameter set; and determining whether to signal hypothetical reference decoder parameters in the video usability information of the video parameter set based on whether timing information is signaled in the video usability information.

In another example, an apparatus is provided that includes means for generating an encoded video bitstream comprising multiple layers. The encoded video bitstream includes a video parameter set defining parameters of the encoded video bitstream. The video parameter set includes video usability information. The apparatus further includes means for determining whether timing information is signaled in the video usability information of the video parameter set. The apparatus further includes means for determining whether to signal hypothetical reference decoder parameters in the video usability information of the video parameter set based on whether timing information is signaled in the video usability information.

The method, apparatuses, and computer readable medium described above for signaling hypothetical reference decoder parameters in a parameter set may further include signaling the hypothetical reference decoder parameters in the video usability information when timing information is signaled in the video usability information. The method, apparatuses, and computer readable medium described above for signaling hypothetical reference decoder parameters in a parameter set may further include not signaling the hypothetical reference decoder parameters in the video usability information when timing information is not signaled in the video usability information.

In some aspects, determining whether the timing information is signaled in the video usability information of the video parameter set includes determining a value of a first flag in the video usability information, the first flag indicating whether the timing information is signaled in the video usability information.

The method, apparatuses, and computer readable medium described above for signaling hypothetical reference decoder parameters in a parameter set may further include determining a value of a second flag in the video usability information based on the value of the first flag, the second flag defining whether hypothetical reference decoder parameters are signaled in the video usability information.

The method, apparatuses, and computer readable medium described above for signaling hypothetical reference decoder parameters in a parameter set may further include providing, in the video usability information, one or more syntax elements for signaling information related to the encoded video bitstream, the information including a condition that the value of the second flag is dependent on the value of the first flag.

The method, apparatuses, and computer readable medium described above for signaling hypothetical reference decoder parameters in a parameter set may further include providing, in the video usability information, one or more syntax elements for signaling information related to the encoded video bitstream, the information including a constraint that the value of the second flag is to be set to zero when the value of the first flag is equal to zero.

In some aspects, the method is executable on a wireless communication device. The wireless communication device comprises a memory configured to store the video data and a processor configured to execute instructions to process the video data stored in the memory. The wireless communication device further comprises a transmitter configured to transmit the encoded video bitstream including the video parameter set. In some aspects, the wireless communication device is a cellular telephone and the encoded video bitstream is modulated according to a cellular communication standard.

In some aspects, the apparatus is a wireless communication device. The wireless communication device comprises a transmitter configured to transmit the encoded video bitstream including the video parameter set. In some aspects, the wireless communication device is a cellular telephone and the encoded video bitstream is modulated according to a cellular communication standard.

In some embodiments, techniques and systems are described for selectively signaling different numbers of video signal information syntax structures in a parameter set. In some examples, an encoder that encodes video data according to a first coding protocol may generate an encoded video bitstream. The encoder may provide the encoded video bitstream to a decoder in a receiving device. A base layer for video data may be provided to the decoder (or another decoder in the same receiving device) by an external source other than the encoder that uses the first coding protocol. For example, the base layer may be encoded according to a second coding protocol that is different than the first coding protocol. In such an example, an encoder that encodes video data using the second coding protocol may provide the base layer to the receiving device. A video signal information syntax structure is signaled for each layer of a multi-layer encoded video bitstream, with a separate video signal information syntax structure being signaled for each layer. In some cases, a number of video signal information syntax structures to include in a parameter set (e.g., video parameter set) is not signaled. In such cases, the number of video signal information syntax structures may be inferred to be equal to the number of layers in the encoded video bitstream. Embodiments are described herein for determining a number of video signal information syntax structures to signal in the parameter set based on whether the base layer is included in the encoded video bitstream or to be provided to the receiving device from the external source.

According to at least one example of selectively signaling different numbers of video signal information syntax structures in a parameter set, a method of encoding video data is provided that includes generating an encoded video bitstream according to a first coding protocol. The encoded video bitstream includes one or more enhancement layers and a video parameter set defining parameters of the encoded video bitstream. The method further includes determining that a syntax structure indicative of the number of video signal information syntax structures provided in the encoded video bitstream is not present in the video parameter set. The method further includes determining the number of video signal information syntax structures to include in the video parameter set when the syntax structure indicative of the number of video signal information syntax structures provided in the encoded video bitstream is not present in the video parameter set. The number is determined as a first value or a second value based on whether a base layer is included in the encoded video bitstream or to be provided to a decoder from an external source.

In another example, an apparatus is provided that includes a memory configured to store video data and a processor. The processor is configured to and may generate, from the video data, an encoded video bitstream according to a first coding protocol. The encoded video bitstream includes one or more enhancement layers and a video parameter set defining parameters of the encoded video bitstream. The processor is further configured to and may determine that a syntax structure indicative of the number of video signal information syntax structures provided in the encoded video bitstream is not present in the video parameter set. The processor is further configured to and may determine the number of video signal information syntax structures to include in the video parameter set when the syntax structure indicative of the number of video signal information syntax structures provided in the encoded video bitstream is not present in the video parameter set. The number is determined as a first value or a second value based on whether a base layer is included in the encoded video bitstream or to be provided to a decoder from an external source.

In another example, a computer readable medium is provided having stored thereon instructions that when executed by a processor perform a method that includes: generating an encoded video bitstream according to a first coding protocol, the encoded video bitstream including one or more enhancement layers and a video parameter set defining parameters of the encoded video bitstream; determining that a syntax structure indicative of the number of video signal information syntax structures provided in the encoded video bitstream is not present in the video parameter set; and determining the number of video signal information syntax structures to include in the video parameter set when the syntax structure indicative of the number of video signal information syntax structures provided in the encoded video bitstream is not present in the video parameter set, wherein the number is determined as a first value or a second value based on whether a base layer is included in the encoded video bitstream or to be provided to a decoder from an external source In another example, an apparatus is provided that includes means for generating an encoded video bitstream according to a first coding protocol. The encoded video bitstream includes one or more enhancement layers and a video parameter set defining parameters of the encoded video bitstream. The apparatus further includes means for determining that a syntax structure indicative of the number of video signal information syntax structures provided in the encoded video bitstream is not present in the video parameter set. The apparatus further includes means for determining the number of video signal information syntax structures to include in the video parameter set when the syntax structure indicative of the number of video signal information syntax structures provided in the encoded video bitstream is not present in the video parameter set. The number is determined as a first value or a second value based on whether a base layer is included in the encoded video bitstream or to be provided to a decoder from an external source.

In some aspects, the number of video signal information syntax structures to include in the video parameter set is determined as the first value when it is determined that the base layer is included in the encoded video bitstream, wherein the first value is equal to a maximum number of layers of the encoded video bitstream.

In some aspects, the number of video signal information syntax structures to include in the video parameter set is determined as the second value when it is determined that the base layer is to be provided to the decoder from the external source, wherein the second value is equal to a maximum number of layers of the encoded video bitstream minus one.

In some aspects, a video signal information syntax structure is assigned to each of the layers included in the encoded video bitstream, and no video signal information syntax structure is assigned to the base layer that is to be provided to the decoder from the external source.

In some aspects, the base layer provided from the external source is encoded according to a second coding protocol, the second coding protocol being different than the first coding protocol. In some examples, the first coding protocol includes a high efficiency video coding protocol, and the second coding protocol includes an advanced video coding protocol.

In another example of selectively signaling different numbers of video signal information syntax structures in a parameter set, a method of decoding video data is provided that includes accessing an encoded video bitstream encoded according to a first coding protocol. The encoded video bitstream includes one or more enhancement layers and a video parameter set defining parameters of the encoded video bitstream. The method further includes determining that a syntax structure indicative of the number of video signal information syntax structures provided in the encoded video bitstream is not present in the video parameter set. The method further includes determining whether a base layer is included in the encoded video bitstream or to be received from an external source. The method further includes determining the number of video signal information syntax structures included in the video parameter set to be a first value or a second value based on whether the base layer is included in the encoded video bitstream or to be received from the external source.

In another example, an apparatus is provided that includes a memory configured to store video data and a processor. The processor is configured to and may access an encoded video bitstream encoded according to a first coding protocol. The encoded video bitstream includes one or more enhancement layers and a video parameter set defining parameters of the encoded video bitstream. The processor is further configured to and may determine that a syntax structure indicative of the number of video signal information syntax structures provided in the encoded video bitstream is not present in the video parameter set. The processor is further configured to and may determine whether a base layer is included in the encoded video bitstream or to be received from an external source. The processor is further configured to and may determine the number of video signal information syntax structures included in the video parameter set to be a first value or a second value based on whether the base layer is included in the encoded video bitstream or to be received from the external source.

In another example, a computer readable medium is provided having stored thereon instructions that when executed by a processor perform a method that includes: accessing an encoded video bitstream encoded according to a first coding protocol, the encoded video bitstream including one or more enhancement layers and a video parameter set defining parameters of the encoded video bitstream; determining that a syntax structure indicative of the number of video signal information syntax structures provided in the encoded video bitstream is not present in the video parameter set; determining whether a base layer is included in the encoded video bitstream or to be received from an external source; and determining the number of video signal information syntax structures included in the video parameter set to be a first value or a second value based on whether the base layer is included in the encoded video bitstream or to be received from the external source.

In another example, an apparatus is provided that includes means for accessing an encoded video bitstream encoded according to a first coding protocol. The encoded video bitstream includes one or more enhancement layers and a video parameter set defining parameters of the encoded video bitstream. The apparatus further includes means for determining that a syntax structure indicative of the number of video signal information syntax structures provided in the encoded video bitstream is not present in the video parameter set. The apparatus further includes means for determining whether a base layer is included in the encoded video bitstream or to be received from an external source. The apparatus further includes means for determining the number of video signal information syntax structures included in the video parameter set to be a first value or a second value based on whether the base layer is included in the encoded video bitstream or to be received from the external source.

The method, apparatuses, and computer readable medium described above for selectively signaling different numbers of video signal information syntax structures in a parameter set may further include determining the number of video signal information syntax structures to be the first value when it is determined that the base layer is included in the encoded video bitstream, wherein the first value is equal to a maximum number of layers of the encoded video bitstream.

The method, apparatuses, and computer readable medium described above for selectively signaling different numbers of video signal information syntax structures in a parameter set may further include determining the number of video signal information syntax structures to be the second value when it is determined that the base layer is to be received from the external source, wherein the second value is equal to a maximum number of layers of the encoded video bitstream minus one.

In some aspects, a video signal information syntax structure is assigned to each of the layers included in the encoded video bitstream, and no video signal information syntax structure is assigned to the base layer that is to be received from the external source.

In some aspects, the base layer provided from the external source is encoded according to a second coding protocol, the second coding protocol being different than the first coding protocol. In some aspects, the first coding protocol includes a high efficiency video coding protocol, and the second coding protocol includes an advanced video coding protocol.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 2 is a block diagram illustrating an example of layer sets defined in a base part and an extension part of a parameter set, in accordance with some embodiments.

FIG. 3 is an example of a syntax structure of a parameter set, in accordance with some embodiments.

FIG. 4 is another example of a syntax structure of a parameter set, in accordance with some embodiments.

FIG. 5 is another example of a syntax structure of a parameter set, in accordance with some embodiments.

FIG. 6 is another example of a syntax structure of a parameter set, in accordance with some embodiments.

FIG. 9A is another example of a syntax structure of a parameter set, in accordance with some embodiments.

FIG. 9B is another example of a syntax structure of a parameter set, in accordance with some embodiments.

DETAILED DESCRIPTION

Figure 1:
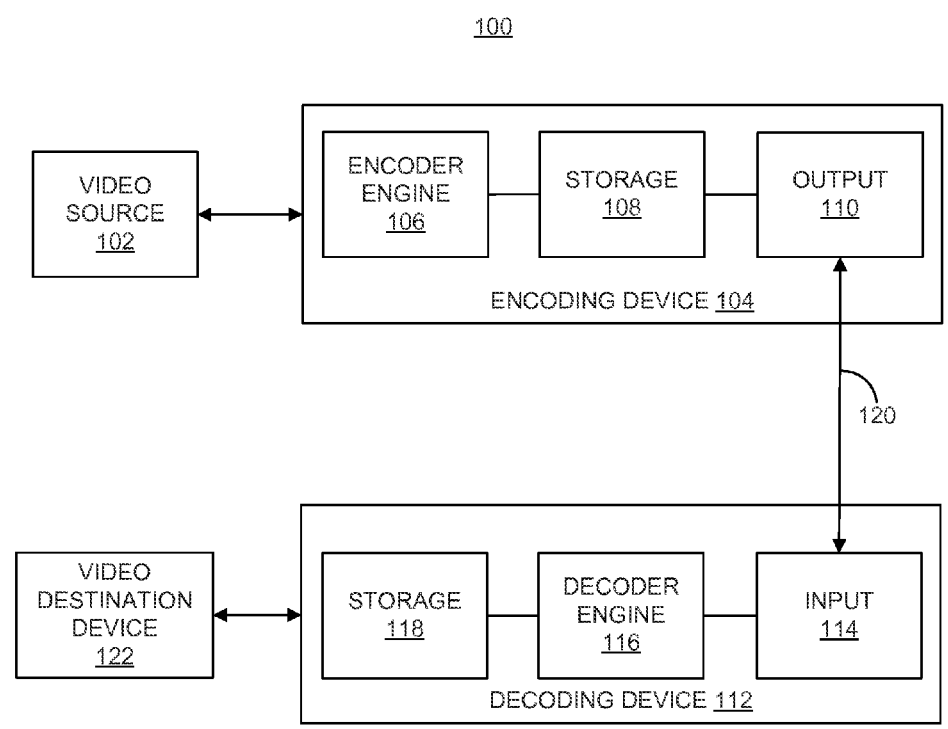
FIG. 1 is a block diagram illustrating an example of an encoding device and a decoding device, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video coding using video encoders and decoders are described herein. For example, one or more systems and methods of coding are directed to improving the signaling of different information in a parameter set, such as the video parameter set (VPS) described in the high efficiency video coding (HEVC) standard.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Many embodiments described herein describe examples using the HEVC standard, or extensions thereof. However, the techniques and systems described herein may also be applicable to other coding standards, such as AVC, MPEG, extensions thereof, or other suitable coding standards. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. An HEVC bitstream, for example, may include a sequence of data units called network abstraction layer (NAL) units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to multiple coded pictures. A coded picture and non-VCL NAL units (if any) corresponding to the coded picture is called an access unit (AU).

NAL units may contain a sequence of bits forming a coded representation of the video data (the encoded video bitstream), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and is square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a plan surface to the PU, direction prediction to extrapolate from neighboring data, or any other suitable types of prediction. Using inter-prediction, each PU is predicted using motion compensation prediction from image data in one or more reference pictures (before or after the current picture in output order).

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded bitstream includes quantized transform coefficients, prediction information (e.g., prediction modes, motion vectors, or the like), partitioning information, and any other suitable data, such as other syntax data. The different elements of the coded bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a one-dimensional vector, the encoder engine 106 may entropy encode the one-dimensional vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units. A sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). The goal of the parameter sets is bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence or bitstream. A coded video sequence is a series of access units that starts with a random access point picture (e.g., an instantaneous decoding refresh (IDR) picture or broken link access (BLA) picture, or other appropriate random access point picture) and includes all access units up to but not including the next random access point picture (or the end of the bitstream). The information in an SPS does not typically change from picture to picture within a coded video sequence. All pictures in a coded video sequence use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

The output 110 of the encoding device 104 may send the NAL units making up the encoded video data over the communications link 120 to the decoding device 112 of the receiving device. The input 114 of the decoding device 112 may receive the NAL units. The communications link 120 may include a signal transmitted using a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 receives the encoded video data and may provide the video data to the decoder engine 116 or to storage 118 for later use by the decoder engine 116. The decoder engine 116 may decode the encoded video data by entropy decoding (e.g., using an entropy decoder) and extracting the elements of the coded video sequence making up the encoded video data. The decoder engine 116 may then rescale and perform an inverse transform on the encoded video data. Residues are then passed to a prediction stage of the decoder engine 116. The decoder engine 116 then predicts a block of pixels (e.g., a PU). In some examples, the prediction is added to the output of the inverse transform.

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 16. An example of specific details of the decoding device 112 is described below with reference to FIG. 17.

As noted above, extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. Each of the NAL units is assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

When encoding a video sequence, it is beneficial to have control over the decoder buffer state for many applications. This applies for communications and/or broadcasting. The encoder should provide the transmitted data such that it is available at the decoder at a decoding time of the corresponding picture. Further, the encoder should provide that the bitstream does not overrun the input bitstream buffer of the decoder as well as the picture buffer in which the decoded pictures are stored.

A hypothetical reference decoder (HRD) is provided to test control over an encoded video sequence. The HRD may be generally operable with video sequences encoded according to a video compression standard. The parameters for configuration and operation of the hypothetical reference decoder can be provided in a video parameter set (VPS) and/or in a sequence parameter set (SPS). The HRD parameters can be provided for multiple operation points for the bitstream, as detailed below. This provides information on the characteristics of the bitstream after further processing (e.g. sub-bitstream extraction). The HRD can be applied in encoders to control the produced bitstream and can also be applied to verify the conformance of a given bitstream to standards specification requirements. Further, conformance of the subject decoder implementation may be tested against the performance and timing requirements defined by the HRD. An encoder may selectively omit some or all signaling of HRD parameters for a bitstream, or for some or all layers of a bitstream. This may provide some constraints related to verification of bitstream conformance to a video compression standard.

Sets of HRD parameters are provided (e.g., in a sequence or video parameter set, or in other messaging) to allow for multi-layer functionality, with each set of parameters corresponding to an operation point. An operation point defines the parameters used for sub-bitstream extraction, and includes a list of target layers (a layer set for that operation point) and a target highest temporal layer. Multiple operation points may be applicable to a given bitstream. An operation point may either include all the layers in a layer set or may be a bitstream formed as a subset of the layer set. For example, an operation point of a bitstream may be associated with a set of layer_identifiers and a temporal identifier. A layer_identifier list may be used to identify the layers to be included in the operation point. The layer_identifier list may be included in a parameter set (e.g., a VPS). The layer_identifier list may include a list of layer_identifier (ID) values (e.g., indicated by a syntax element nuh_layer_id). In some cases, the layer ID values may include non-negative integers, and each layer may be associated with a unique layer ID value so that each layer ID value identifies a particular layer. A highest temporal ID (e.g., identified by a variable TemporalId) may be used to define a temporal subset. In some embodiments, a layer_identifier list and a target highest temporal ID may be used as inputs to extract an operation point from a bitstream. For example, when a NAL unit has a layer_identifier that is included in a set of layer_identifiers associated with an operation point, and the temporal identifier of the NAL unit is less than or equal to the temporal identifier of the operation point, the NAL unit is associated with the operation point. A target output layer is a layer that is to be output, and an output layer set is a layer set that is associated with a set of target output layers. For example, an output layer set is a set of layers including the layers of a specified layer set, where one or more layers in the set of layers are indicated to be output layers. An output operation point corresponds to a particular output layer set. For example, an output operation point may include a bitstream that is created from an input bitstream by operation of a sub-bitstream extraction process with the input bitstream, a target highest temporal identifier (TemporalId), and a target layer_identifier list as inputs, and that is associated with a set of output layers.

As previously described, parameter sets are provided with an encoded video bitstream (e.g., in one or more non-VCL NAL units). The parameter sets contain high-level syntax information defining various parameters of the encoded video bitstream. One example of a parameter set includes a video parameter set (VPS). The VPS may have two parts, including a base part (or base VPS) and an extension part (or VPS extension). The base VPS is defined in the first edition of the HEVC standard, and the VPS extension is defined in a later edition of the HEVC standard. The base VPS may contain information related to the HEVC base layer (or compatible layer). The base VPS may also contain temporal scalability information, including a maximum number of temporal layers. One or more layer sets may be defined in the base VPS. For example, the base VPS may define a layer set 0 that corresponds to a layer set including the base layer. The VPS extension may contain information related to one or more additional layers beyond the base layer. For example, one or more additional layer sets may be defined in the VPS extension, which are not defined in the base part.

FIG. 2 illustrates an example of layer sets defined in a base part (base VPS 202) and an extension part (VPS extension 204) of a video parameter set. The base VPS 202 defines layer set 0, layer set 1, layer set 2, and layer set 3. The layer set 0 includes layer 0. The layer set 1 includes layer 0 and layer 1. The layer set 2 includes layer 0, layer 1, and layer 2. The layer set 3 includes layer 0, layer 1, layer 2, and layer 3. The VPS extension 204 defines additional layer sets that are not defined in the base VPS 202. The additional layer sets include layer set 4 and layer set 5. The additional layer set 4 includes layer 4, and the additional layer set 5 includes layer 5 and layer 6. In some examples, layer 0 may be a base layer, and layers 1, 2, 3, 4, 5, and 6 may be enhancement layers. For example, the layer 0 may be a base layer with a layer_identifier (ID) equal to 0. The base layer may also be referred to as a compatible layer. The base layer conforms to a profile of the first version of HEVC, and represents the lowest available layer in a bitstream. The layers 1, 2, 3, 4, 5, and 6 may include enhancement layers having corresponding layer IDs. For example, layer 1 has a layer ID equal to 1, layer 2 has a layer ID equal to 2, layer 3 has a layer ID equal to 3, layer 4 has a layer ID equal to 4, layer 5 has a layer ID equal to 5, and layer 6 has a layer ID equal to 6. Enhancement layers have increased spatial resolution, temporal resolution or frame rate, and/or reconstruction fidelity (or quality) as compared to the base layer. In some examples, layer 0 may have a frame rate of 7.5 Hz and a bit rate of 64 kilobytes per second, layer 1 may have a frame rate of 15 Hz and a bit rate of 128 kilobytes per second, layer 2 may have a frame rate of 15 Hz and a bit rate of 256 kilobytes per second, layer 3 may have a frame rate of 30 Hz and a bit rate of 512 kilobytes per second, layer 4 may have a frame rate of 30 Hz and a bit rate of 1 megabyte per second, layer 5 may have a frame rate of 60 Hz and a bit rate of 1.5 megabytes per second, and layer 6 may have a frame rate of 60 Hz and a bit rate of 2 megabytes per second. In some examples, frame rates may also referred to as picture rates, and thus the different layers 0, 1, 2, 3, 4, 5, and 6 may also have different picture rates. One of ordinary skill in the art will appreciate that these numbers are provided as an example only, and that the layers may have other frame rates and bit rates according to the particular implementation.

Signaling information is provided in the VPS that defines characteristics of one or more layer sets defined in the base VPS 202. In some examples, the signaling information may define rate information for the one or more layer sets. Rate information includes, for example, bit rate information, picture rate information, or other suitable rate information that applies to the layers in a given layer set. In one example, bit rate information for a given layer set may include an average bit rate or an average picture rate of the layers of the given layer set. In another example, the bit rate information may include a maximum bit rate of the layers of a given layer set. Other examples of rate information are provided below. In some examples, the signaling information may include target output information indicating whether a layer in a layer set is a target output layer of an output layer set. For example, the target output information may include an output_layer_flag[i][j] syntax element. As used herein, the variables [i] and [j] refer to the j-th layer of the i-th layer set. The rate information and the target output information should be signaled for all layer sets (defined in the base and extension parts of the VPS), including the layer sets and the additional layer sets, as clients may choose to request or consume an additional layer set based on such information. However, with the current signaling scheme defined in the HEVC standard, signaling information is only signaled for layer sets that are defined in the base part of the VPS.

The number of layer sets that are signaled in the base VPS (e.g., base VPS 202) is indicated by a syntax element of the VPS. For example, FIG. 3 illustrates an example of a syntax structure 300 of a VPS extension. The entry 302 includes syntax element 306, labeled vps_num_layer_sets_minus1, that indicates the number of layer sets that are signaled in the base VPS. The syntax element 304, labeled output_layer_flag[i][j], indicates whether a layer in a layer set is a target output layer of an output layer set. Because the vps_num_layer_sets_minus1 syntax element 306 indicates the number of layer sets signaled in the base VPS (and not the additional layer sets signaled in the VPS extension), the output_layer_flag[i][j] syntax element 304 is only signaled for those layer sets defined in the base VPS.

The total number of layer sets that are signaled in the base VPS and VPS extension (including the additional layer sets signaled in the VPS Extension, if present) is indicated by a variable NumLayerSets that is derived based on syntax elements of the VPS. Embodiments described herein include updating the signaling of information in the VPS related to layer sets so that the signaling information (e.g., rate information and target output information) is signaled for all layer sets, including the additional layer sets defined in the VPS extension 204. For example, as illustrated in FIG. 4, the vps_num_layer_sets_minus1 syntax element 306 may be removed from the VPS extension and a NumLayerSets variable 406 may be added to the entry 302 to create a new syntax structure 400. Because the NumLayerSets variable 406 indicates the total number of layer sets that are signaled in the base VPS and the VPS extension, the output_layer_flag[i][j] syntax element 304 is signaled for the layer sets defined in the base VPS and the additional layer sets defined in the VPS extension.

FIG. 5 illustrates another example of a syntax structure 500 of a VPS. The syntax structure 500 is part of a video usability information (VUI) portion of the VPS extension, which may be referred to herein as the VPS VUI. The VPS VUI syntax structure contains information that is useful for preparing the decoded video for output and display. The VPS VUI may include information related to the encoded video, such as rate information, sample aspect ratio, the original color space and representation of the encoded video, picture timing information, or other information. The inclusion of different parts in the VUI syntax structure is optional and can be decided as required by a particular implementation or application. In some examples, default values may be specified for some or all VUI parameters for cases in which the corresponding VUI parameters have not been provided.

In the example of FIG. 5, the syntax structure 500 of the VPS VUI includes a bit_rate_present_flag[i][j] syntax element 504 that includes a flag indicating whether bit rate information is available for one or more layer sets signaled in the VPS. For example, a value of 0 or 1 for the flag may indicate that bit rate information is available for the one or more layer sets. The syntax structure 500 of the VPS VUI further includes pic_rate_present_flag[i][j] syntax element 506 that includes a flag indicating whether picture rate information is available for one or more layer sets signaled in the VPS. For example, a value of 0 or 1 for the flag may indicate that picture rate information is available for the one or more layer sets. The syntax structure 500 of the VPS VUI also includes an avg_bit_rate[i][j] syntax element 508 that indicates an average bit rate for each layer set of the one or more layer sets signaled in the VPS. The syntax structure 500 of the VPS VUI further includes a max_bit_rate syntax element 510 that indicates a maximum bit rate for each layer set of the one or more layer sets signaled in the VPS. The syntax structure 500 of the VPS VIA also includes a constant_pic_rate_idc[i][j] syntax element 512 that indicates whether a layer set of the one or more layer sets signaled in the VPS has a constant picture rate. The syntax structure 500 of the VPS VUI further includes a avg_pic_rate[i][j] syntax element 514 that indicates an average picture rate for each layer set of the one or more layer sets signaled in the VPS. One of ordinary skill in the art will appreciate that syntax elements 504-514 are examples, and that more or fewer sets of signaling information may be present in the syntax structure 500 of the VPS VUI.

The information provided in syntax elements 504-514 is signaled for those layer sets that are defined in the VPS extension, which is provided in entry 502 of the syntax structure 500. The entry 502 includes a syntax element that indicates the number of layer sets that are signaled. The entry 502 shown in FIG. 5 includes the vps_num_layer_sets_minus1 syntax element 516, which indicates the number of layer sets signaled in the base VPS (and not the additional layer sets signaled in the VPS extension). Accordingly, the rate information syntax elements 504-514 are only signaled for those layer sets defined in the base VPS. FIG. 6 illustrates an example of a syntax structure 600 of the VPS VUI with updated signaling information that relates to all layer sets, including the additional layer sets defined in the VPS extension. In the example of FIG. 6, the vps_num_layer_sets_minus1 syntax element 516 is removed from the VPS VUI and a NumLayerSets variable 616 is added to the entry 502 to create the new syntax structure 600. Because the NumLayerSets variable 616 indicates the total number of layer sets that are signaled in the base VPS and the VPS extension, the rate information signaled in the syntax elements 504-514 is signaled for the layer sets defined in the base VPS and the additional layer sets defined in the VPS extension.

Figure 7:
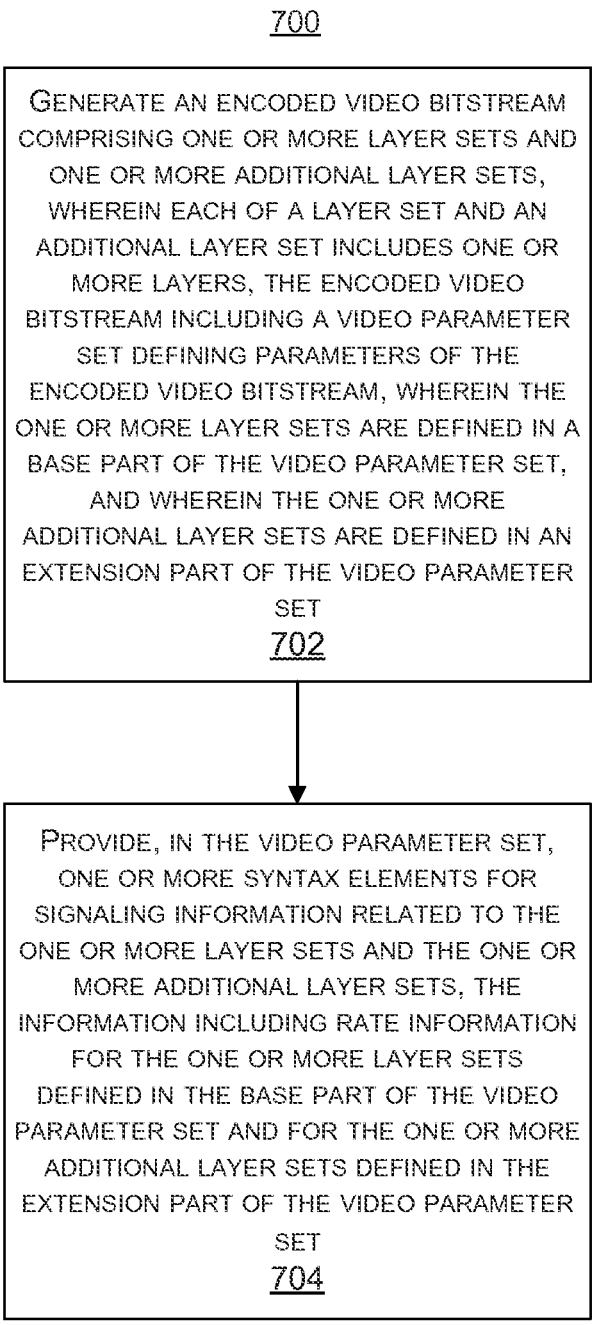
FIG. 7 is a flowchart illustrating an embodiment of a process of encoding video data for signaling information for layer sets in a parameter set, in accordance with some embodiments.

FIG. 7 illustrates an embodiment of a process 700 of encoding video data. The process 700 is implemented to signal information for layer sets (including additional layer sets) defined in a parameter set, such as a video parameter set. In some aspects, the process 700 may be performed by a computing device or an apparatus, such as the encoding device 104 shown in FIG. 1 or FIG. 16. For example, the computing device or apparatus may include an encoder, or a processor, microprocessor, microcomputer, or other component of an encoder that is configured to carry out the steps of process 700.

Process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 702, the process 700 of encoding video data includes generating an encoded video bitstream comprising one or more layer sets and one or more additional layer sets. Each of a layer set and an additional layer set includes one or more layers, as previously described. The encoded video bitstream includes a video parameter set defining parameters of the encoded video bitstream. The one or more layer sets are defined in a base part of the video parameter set, and the one or more additional layer sets are defined in an extension part of the video parameter set. The encoded video bitstream may be encoded using an HEVC coding technique, or other suitable coding technique. In one example, the one or more layer sets defined in the base part of the video parameter set (VPS) include the layer set 0, the layer set 1, the layer set 2, and the layer set 3 defined in the base VPS 202 shown in FIG. 2, and the one or more additional layer sets include the layer set 4 and the layer set 5 defined in the VPS extension 204 shown in FIG. 2. One of ordinary skill in the art will appreciate that the one or more layer sets and/or the one or more additional layer sets may include other layer sets than those shown in the examples of FIG. 2.

At 704, the process 700 includes providing, in the video parameter set, one or more syntax elements for signaling information related to the one or more layer sets and the one or more additional layer sets. The information includes rate information for the one or more layer sets defined in the base part of the video parameter set and for the one or more additional layer sets defined in the extension part of the video parameter set. Accordingly, the rate information is signaled for both the layer sets defined in the base VPS and for the additional layer sets defined in the VPS extension. For example, the rate information may be signaled for the one or more layer sets defined in the base part of the video parameter set and for the one or more additional layer sets by inserting the NumLayerSets variable 616 in the entry 502 of the VPS VUI. In some embodiments, different rate information is signaled for each different layer set of the one or more layer sets and the one or more additional layer sets. For example, a first set of rate information may be signaled for the layer set 0 defined in the base VPS 202, and a second set of rate information may be signaled for the layer set 4 defined in the VPS extension 204.

In some embodiments, the rate information includes bit rate information. In some embodiments, the rate information includes picture rate information. In some examples, the rate information may be included in any of the syntax elements 504-514 shown in FIG. 5 and FIG. 6. For example, the one or more syntax elements in the video parameter set include a flag that indicates whether bit rate information is available for an additional layer set. The flag may be set to a value of 0 or 1 to indicate that bit rate information is available for the additional layer set. The one or more syntax elements may also include a flag indicating whether bit rate information is available for a layer set defined in the base part of the VPS. An example of such a flag is the bit_rate_present_flag[i][j] syntax element 504 shown in FIG. 5 and FIG. 6.

In another example, the one or more syntax elements in the video parameter set include a flag that indicates whether picture rate information is available for an additional layer set. The flag may be set to a value of 0 or 1 to indicate that picture rate information is available for the additional layer set. The one or more syntax elements may also include a flag indicating whether picture rate information is available for a layer set defined in the base part of the VPS. An example of such a flag is the pic_rate_present_flag[i][j] syntax element 506 shown in FIG. 5 and FIG. 6.

In another example, the one or more syntax elements in the video parameter set include a syntax element that indicates an average bit rate for an additional layer set. The one or more syntax elements may also include a similar syntax element indicating an average bit rate for a layer set defined in the base part of the VPS. An example of such a syntax element is the avg_bit_rate[i][j] syntax element 508 shown in FIG. 5 and FIG. 6.

In another example, the one or more syntax elements in the video parameter set include a syntax element that indicates a maximum bit rate for an additional layer set. The one or more syntax elements may also include a similar syntax element indicating a maximum bit rate for a layer set defined in the base part of the VPS. An example of such a syntax element is the max_bit_rate[i][j] syntax element 510 shown in FIG. 5 and FIG. 6.

In another example, the one or more syntax elements in the video parameter set include a syntax element that indicates whether an additional layer set has a constant picture rate. The one or more syntax elements may also include a similar syntax element indicating whether a layer set defined in the base part of the VPS has a constant picture rate. An example of such a syntax element is the constant_pic_rate_idc[i][j] syntax element 512 shown in FIG. 5 and FIG. 6.

In another example, the one or more syntax elements in the video parameter set include a syntax element that indicates an average picture rate for an additional layer set. The one or more syntax elements may also include a similar syntax element indicating an average picture rate for a layer set defined in the base part of the VPS. An example of such a syntax element is the avg_pic_rate[i][j] syntax element 514 shown in FIG. 5 and FIG. 6.

In some embodiments, the one or more syntax elements may signal target output information for both the layer sets defined in the base VPS and for the additional layer sets defined in the VPS extension. For example, the one or more syntax elements in the video parameter set include a flag that indicates whether a layer in an additional layer set is a target output layer of an output layer set. The flag may be set to a value of 0 or 1 to indicate that the layer in the additional layer set is a target output layer of an output layer set. The one or more syntax elements may also include a similar flag indicating whether a layer in a layer set defined in the base VPS is a target output layer of an output layer set. An example of such a flag is the output_layer_flag[i][j] syntax element 304 shown in FIG. 3 and FIG. 4.

Figure 8:
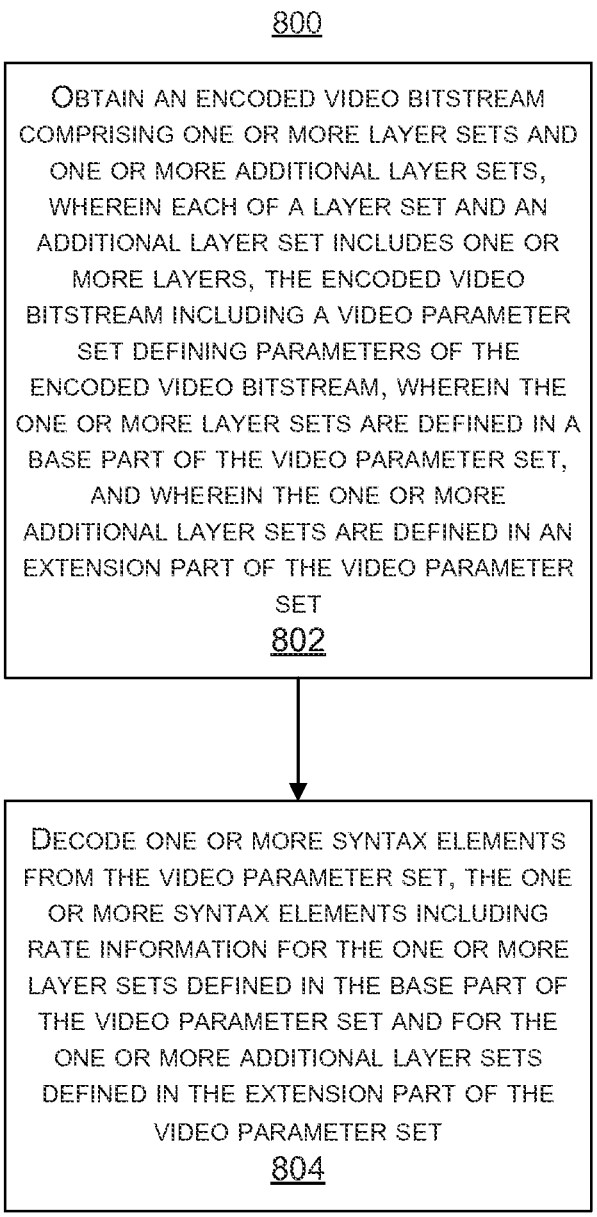
FIG. 8 is a flowchart illustrating an embodiment of a process of decoding video data including signaled information for layer sets in a parameter set, in accordance with some embodiments.

FIG. 8 illustrates an embodiment of a process 800 of decoding video data. The process 800 is implemented to receive and decode signaling information for layer sets (including additional layer sets) defined in a parameter set, such as a video parameter set. In some aspects, the process 800 may be performed by a computing device or an apparatus, such as the decoding device 112 shown in FIG. 1 or in FIG. 17. For example, the computing device or apparatus may include a decoder, or a processor, microprocessor, microcomputer, or other component of a decoder that is configured to carry out the steps of process 800.

Process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 802, the process 800 of decoding video data includes obtaining an encoded video bitstream comprising one or more layer sets and one or more additional layer sets. Each of a layer set and an additional layer set includes one or more layers. The encoded video bitstream includes a video parameter set defining parameters of the encoded video bitstream. The one or more layer sets are defined in a base part of the video parameter set, and the one or more additional layer sets are defined in an extension part of the video parameter set. The encoded video bitstream may be encoded using an HEVC coding technique, or other suitable coding technique. In one example, the one or more layer sets defined in the base part of the video parameter set (VPS) include the layer set 0, the layer set 1, the layer set 2, and the layer set 3 defined in the base VPS 202 shown in FIG. 2, and the one or more additional layer sets include the layer set 4 and the layer set 5 defined in the VPS extension 204 shown in FIG. 2. One of ordinary skill in the art will appreciate that the one or more layer sets and/or the one or more additional layer sets may include other layer sets than those shown in the examples of FIG. 2.

At 804, the process 800 includes decoding one or more syntax elements from the video parameter set. The one or more syntax elements include rate information for the one or more layer sets defined in the base part of the video parameter set and for the one or more additional layer sets defined in the extension part of the video parameter set. In some embodiments, the the one or more syntax elements include different rate information for each different layer set of the one or more layer sets and the one or more additional layer sets. For example, a first set of rate information may be signaled for the layer set 0 defined in the base VPS 202, and a second set of rate information may be signaled for the layer set 1 defined in the VPS extension 204.

In some embodiments, the rate information includes bit rate information. In some embodiments, the rate information includes picture rate information. In some examples, the rate information may be included in any of the syntax elements 504-514 shown in FIG. 5 and FIG. 6. For example, the one or more syntax elements in the video parameter set include a flag that indicates whether bit rate information is available for an additional layer set. The flag may be set to a value of 0 or 1 to indicate that bit rate information is available for the additional layer set. The one or more syntax elements may also include a flag indicating whether bit rate information is available for a layer set defined in the base part of the VPS. An example of such a flag is the bit_rate_present_flag[i][j] syntax element 504 shown in FIG. 5 and FIG. 6.

In another example, the one or more syntax elements in the video parameter set include a flag that indicates whether picture rate information is available for an additional layer set. The flag may be set to a value of 0 or 1 to indicate that picture rate information is available for the additional layer set. The one or more syntax elements may also include a flag indicating whether picture rate information is available for a layer set defined in the base part of the VPS. An example of such a flag is the pic_rate_present_flag[i][j] syntax element 506 shown in FIG. 5 and FIG. 6.

In another example, the one or more syntax elements in the video parameter set include a syntax element that indicates an average bit rate for an additional layer set. The one or more syntax elements may also include a similar syntax element indicating an average bit rate for a layer set defined in the base part of the VPS. An example of such a syntax element is the avg_bit_rate[i][j] syntax element 508 shown in FIG. 5 and FIG. 6.

In another example, the one or more syntax elements in the video parameter set include a syntax element that indicates a maximum bit rate for an additional layer set. The one or more syntax elements may also include a similar syntax element indicating a maximum bit rate for a layer set defined in the base part of the VPS. An example of such a syntax element is the max_bit_rate[i][j] syntax element 510 shown in FIG. 5 and FIG. 6.

In another example, the one or more syntax elements in the video parameter set include a syntax element that indicates whether an additional layer set has a constant picture rate. The one or more syntax elements may also include a similar syntax element indicating whether a layer set defined in the base part of the VPS has a constant picture rate. An example of such a syntax element is the constant_pic_rate_idc[i][j] syntax element 512 shown in FIG. 5 and FIG. 6.

In another example, the one or more syntax elements in the video parameter set include a syntax element that indicates an average picture rate for an additional layer set. The one or more syntax elements may also include a similar syntax element indicating an average picture rate for a layer set defined in the base part of the VPS. An example of such a syntax element is the avg_pic_rate[i][j] syntax element 512 shown in FIG. 5 and FIG. 6.

In some embodiments, the one or more syntax elements may signal target output information for both the layer sets defined in the base VPS and for the additional layer sets defined in the VPS extension. For example, the one or more syntax elements in the video parameter set include a flag that indicates whether a layer in an additional layer set is a target output layer of an output layer set. The flag may be set to a value of 0 or 1 to indicate that the layer in the additional layer set is a target output layer of an output layer set. The one or more syntax elements may also include a similar flag indicating whether a layer in a layer set defined in the base VPS is a target output layer of an output layer set. An example of such a flag is the output_layer_flag[i][j] syntax element 304 shown in FIG. 3 and FIG. 4.

Using the above-described techniques of signaling information for layer sets (including additional layer sets) defined in a parameter set, rate information and target output information is signaled for the layer sets defined in the base VPS and also for the additional layer sets defined in the VPS extension.

In further embodiments, techniques and systems are described for signaling hypothetical reference decoder parameters in a parameter set in only certain conditions. Hypothetical reference decoder parameters are provided in a parameter set to allow for multi-layer functionality. Different sets of hypothetical reference decoder parameters correspond to different operation points. The hypothetical reference decoder parameters can be used in various ways. For example, a bitstream conformance check may include performing a normative test using hypothetical reference decoder parameters. The normative test uses the hypothetical reference decoder parameters to check that a bitstream or sub-bitstream can be decoded by a hypothetical reference decoder that is conceptually connected to the output of an encoder and that includes a coded picture buffer, a decoder, and decoded picture buffer. The encoder must make sure various constraints are met when creating a bitstream to meet conformance, including making sure that the tools used in the bitstream match those signaled in the parameter sets, making sure that the coded picture buffer of the hypothetical reference decoder does not overflow or underflow, making sure pictures marked as used for reference are not used as reference afterwards, or other requirements. A buffer overflow occurs when too many coded data units are present for the decoder buffer. Underflow occurs when it is the time for the decoder to process some coded data units but the buffer is empty.

Hypothetical reference decoder parameters may be signaled in the VPS and in the VPS extension (e.g., in the VPS VUI) for different operation points and associated layer sets. The signaling of the hypothetical reference decoder parameters in the VPS VUI may be controlled by a gating flag. The value of this flag can be set equal to 1 or 0 independently by encoders. In one example, hypothetical reference decoder parameters may not be signaled in the VPS VUI when a value of the gating flag is set to 0. In another example, hypothetical reference decoder parameters may be signaled in the VPS VUI when a value of the gating flag is set to 1. One of ordinary skill in the art will appreciate that hypothetical reference decoder parameters may not be signaled when the value is set to 1, and that hypothetical reference decoder parameters may be signaled when the value is set to 0.

Embodiments are described herein for signaling hypothetical reference decoder parameters in the VPS VUI when certain information is signaled in the VPS and/or the VPS VUI. For example, hypothetical reference decoder parameters depend on timing information provided in the VPS VUI, in the base part of the VPS, or in both the VPS VUI and the base VPS. Timing information is provided to allow a correct play-out speed of a decoded video sequence. The syntax structure for hypothetical reference decoder parameters is placed in the timing information section of the VPS VUI. In some cases, the timing information defines parameters needed to install a timing scheme for a decoding process, such as a clock rate and the length of a clock tick. The timing information may further include a flag indicating that a picture order count (defining a relation of the pictures in terms of ordering and distance if used for prediction) is proportional to the output time of the picture relative to the beginning of the coded video sequence (e.g. an intra random access picture (IRAP), such as an instantaneous decoding refresh (IDR) picture where the picture order count is reset). Using the indication provided by the flag, the picture output timing can be directly derived from the picture order count.

Signaling of hypothetical reference decoder information when timing information is not present in the VPS is an inefficient use of bits, leading to wasted processing and use of network resources. Accordingly, hypothetical reference decoder parameters may be signaled in the VPS VUI when timing information is also signaled in the VPS or the VPS VUI. Similarly, hypothetical reference decoder parameters may not be signaled in the VPS VUI when no timing information is signaled in the VPS or the VPS VUI. In some aspects, an encoder (or other device, such as an editor, splicer, or the like) may condition the gating flag to be dependent on a value of a syntax element that indicates whether timing information is present in the VPS or the VPS VUI.

In one example, the gating flag may be signaled or may not be signaled depending on the presence of the timing information. FIG. 9A illustrates an example of a syntax structure 900 of a VPS VUI with a timing information syntax element 902, labeled vps_timing_info_present_flag. The timing information syntax element 902 indicates whether timing information is included in the VPS or the VPS VUI. The syntax structure 900 further includes gating flag syntax element 904, labeled vps_vui_bsp_hrd_present_flag. The presence of the gating flag syntax element 904 is dependent on the value of the timing information syntax element 902. When the timing information syntax element 902 is set to a value of 0 (indicating that no timing information is present), the gating flag syntax element 904 may not be signaled in the VPS VUI (in which case the syntax structure 900 does not include the gating flag syntax element 904 when the VPS VUI is sent to the decoder). In such an example, the value of the gating flag syntax element 904 is determined by the encoder to be a value of 0, indicating that no hypothetical reference decoder parameters are to be signaled in the VPS VUI. Accordingly, the encoder (or other device, such as an editor, splicer, or the like) may determine not to signal hypothetical reference decoder parameters in the VPS VUI. This example is illustrated in FIG. 9A by the inclusion of the condition 906 with the timing information syntax element 902 in the syntax structure. For example, when the timing information syntax element 902 is set to a value of 0 (indicating that no timing information is present), the encoder (or other device, such as an editor, splicer, or the like) may determine not to signal hypothetical reference decoder parameters in the VPS VUI. The encoder (or other device) may then remove the gating flag syntax element 904 from the syntax structure 900. When the VPS VUI is received by the decoder (or other device receiving the VPS VUI), the decoder infers the value of the gating flag to be a value of 0 based on the absence of the gating flag syntax element 904. The decoder then determines that no hypothetical reference decoder parameters are signaled in the VPS VUI based on the inferred value of 0 for the gating flag.

In another example, a value of the gating flag may be dependent on the presence of the timing information. For example, a constraint may be added to express that when the timing information syntax element 902 is equal to 0, the value of the gating flag syntax element 904 shall also be equal to 0. This example is illustrated in FIG. 9B by the absence of the condition 906 from the syntax structure 900. In this example, a timing information syntax element indicating whether timing information is present in the VPS or the VPS VUI is signaled earlier in the VPS or the VPS VUI (not shown in FIG. 9). When the timing information syntax element (not shown in FIG. 9) is set to a value of 0 (indicating that no timing information is present), the encoder (or other device, such as an editor, splicer, or the like) may be forced to set the gating flag syntax element 904 to a value of 0, indicating that no hypothetical reference decoder parameters are signaled in the VPS VUI. The encoder (or other device, such as an editor, splicer, or the like) may determine not to signal hypothetical reference decoder parameters in the VPS VUI as a result. When the VPS VUI is received by the decoder (or other device receiving the VPS VUI), the decoder determines that the value of the gating flag syntax element 904 is set to a value of 0 to learn that no hypothetical reference decoder parameters are signaled in the VPS VUI.

Figure 10:
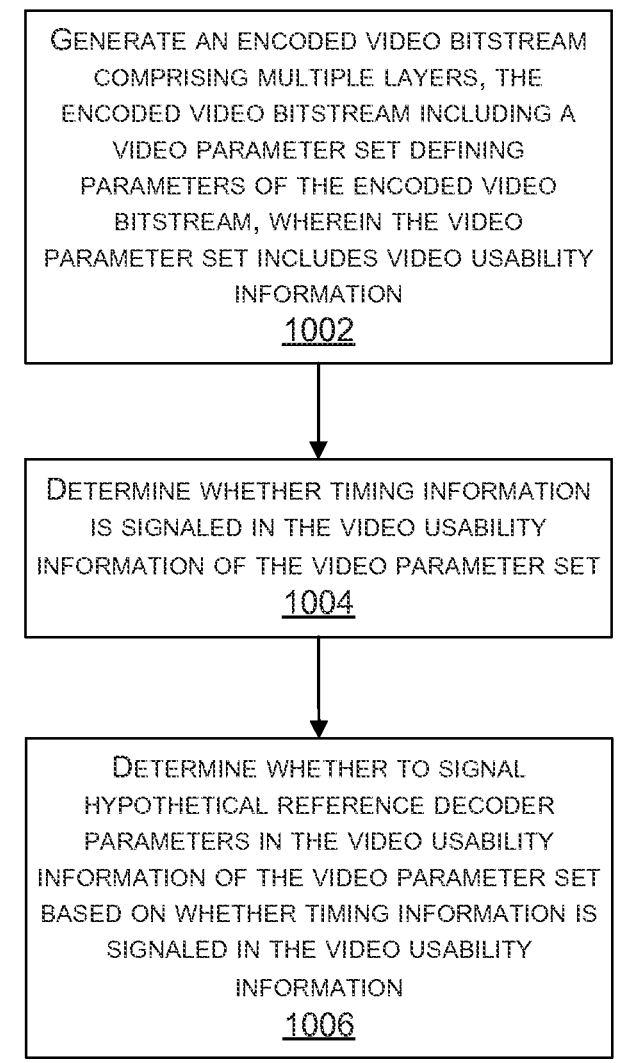
FIG. 10 is a flowchart illustrating an embodiment of a process of encoding video data for signaling hypothetical reference decoder parameters in a parameter set, in accordance with some embodiments.

FIG. 10 illustrates an embodiment of a process 1000 of encoding video data. The process 1000 is implemented to signal hypothetical reference decoder parameters in a parameter set in only certain situations. In some aspects, the process 1000 may be performed by a computing device or an apparatus, such as the encoding device 104 shown in FIG. 1 or in FIG. 16. For example, the computing device or apparatus may include an encoder, or a processor, microprocessor, microcomputer, or other component of an encoder that is configured to carry out the steps of process 1000.

Process 1000 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1002, the process 1000 of encoding video data includes generating an encoded video bitstream comprising multiple layers. The encoded video bitstream includes a video parameter set defining parameters of the encoded video bitstream. The video parameter set includes video usability information, which may be referred to as a VPS VUI. The encoded video bitstream may be encoded using an HEVC coding technique, or other suitable coding technique.

At 1004, the process 1000 includes determining whether timing information is signaled in the video usability information of the video parameter set. In some embodiments, determining whether the timing information is signaled in the video usability information of the video parameter set includes determining a value of a first flag in the video usability information. The first flag indicates whether the timing information is signaled in the video usability information (or other portion of the video parameter set). For example, the first flag may include a timing information syntax element (e.g., timing information syntax element 902). The timing information syntax element may be checked to determine if timing information is signaled. For example, a value of 0 may indicate that timing information is not signaled. In another example, a value of 1 may indicate that timing information is not signaled.

At 1006, the process 1000 includes determining whether to signal hypothetical reference decoder parameters in the video usability information of the video parameter set based on whether timing information is signaled in the video usability information (or other portion of the video parameter set). In some examples, the process 1000 includes signaling the hypothetical reference decoder parameters in the video usability information when timing information is signaled in the video usability information (or other portion of the video parameter set). The process 1000 further includes not signaling the hypothetical reference decoder parameters in the video usability information when timing information is not signaled in the video usability information (or other portion of the video parameter set). For example, an encoder or other network device may make a determination to not signal the hypothetical reference decoder parameters in the video usability information when the timing information is absent.

In some embodiments, the process 1000 includes determining a value of a second flag in the video usability information based on the value of the first flag. The second flag defines whether hypothetical reference decoder parameters are signaled in the video usability information. For example, the second flag may include a gating flag syntax element (e.g., gating flag syntax element 904).

In some embodiments, the process 1000 includes providing, in the video usability information, one or more syntax elements for signaling information related to the encoded video bitstream, the information including a condition that the value of the second flag is dependent on the value of the first flag. For example, referring to FIG. 9, when the timing information syntax element 902 is set to a value of 0 (indicating that no timing information is present), the gating flag syntax element 904 may not be signaled in the VPS VUI (in which case the syntax structure 900 does not include the gating flag syntax element 904). The value of the gating flag syntax element 904 is then inferred by the encoder to be a value of 0, indicating that no hypothetical reference decoder parameters are to be signaled in the VPS VUI. The encoder may make a determination not to signal hypothetical reference decoder parameters in the VPS VUI.

In some embodiments, the process 1000 includes providing, in the video usability information, one or more syntax elements for signaling information related to the encoded video bitstream, the information including a constraint that the value of the second flag is to be set to zero when the value of the first flag is equal to zero. For example, as illustrated in FIG. 9, the condition 906 with the gating flag syntax element 904 may be added to the syntax structure 900. Based on the condition 906, when the timing information syntax element 902 is set to a value of 0 (indicating that no timing information is present), the encoder may set the gating flag syntax element 904 to a value of 0, indicating that no hypothetical reference decoder parameters are signaled in the VPS VUI. The encoder may determine not to signal hypothetical reference decoder parameters in the VPS VUI as a result.

In some aspects, the process 1000 is executable on a wireless communication device. The wireless communication device may include a memory configured to store the video data. The memory may include storage 108 shown in FIG. 1. The wireless communication device may also include a processor configured to execute instructions to process the video data stored in the memory. The processor may include the encoder engine 106 shown in FIG. 1, or another suitable processor for processing video data. The wireless communication device may further include a transmitter configured to transmit the encoded video bitstream including the video parameter set. The transmitter may be a wireless transmitter, or may be part of a wireless transceiver. In some aspects, the wireless communication device is a cellular telephone and the encoded video bitstream is modulated according to a cellular communication standard. For example, the encoded video bitstream may be modulated using a modulator (e.g., a Quadrature Phase Shift modulator, a quadrature phase shift key modulator, orthogonal frequency-division multiplexing modulator, or any other suitable modulator, or a combination thereof).

The above-described techniques prevent signaling of hypothetical reference decoder information when timing information is not present. Signaling of such information when no timing information is present is an inefficient use of resources, wasting valuable processing and network resources. The encoder (or other device, such as an editor, splicer, or the like) may intelligently determine when to signal hypothetical reference decoder parameters based on the presence or absence of timing information.

In further embodiments, techniques and systems are described for selectively signaling different numbers of video signal information syntax structures in a parameter set. For example, embodiments are described herein for determining a number of video signal information syntax structures to signal in the parameter set based on whether the base layer is included in an encoded video bitstream or to be provided to a decoding device from an external source.

Figure 11:
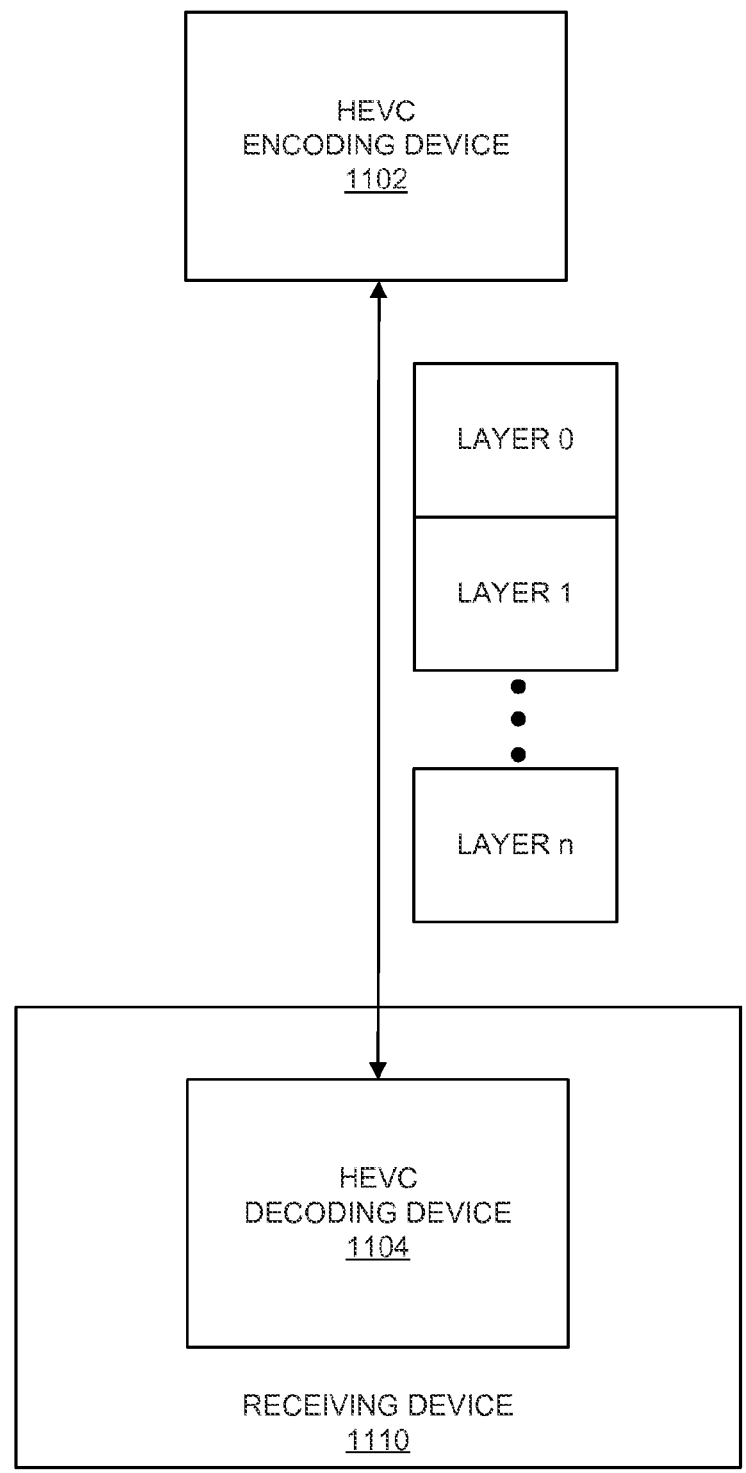
FIG. 11 is a block diagram illustrating an environment with an encoding device for providing encoded video data with multiple layers, in accordance with some embodiments.

FIG. 11 illustrates an example environment 1100 in which an encoding device generates various layers of an encoded video bitstream, including a base layer. The environment 1100 includes an HEVC encoding device 1102 that generates an encoded video bitstream using the HEVC video coding standard. One of ordinary skill in the art will appreciate that the techniques described herein apply to other encoding devices that may use different coding standards than HEVC standard, such as one or more of the AVC and MPEG standards. The HEVC encoding device 1102 may generate an HEVC compliant video bitstream that includes a base layer and one or more enhancement layers. For example, the HEVC encoding device 1102 may generate base layer 0 and enhancement layer 1 to layer n. Layer n refers to the fact that the HEVC encoding device 1102 can generate any number of enhancement layers, as determined by the particular implementation or application and as constrained by the HEVC standard.

The HEVC decoding device 1104 of the receiving device 1110 may receive the base and enhancement layers from the HEVC encoding device 1102. In the example of FIG. 11, the base layer is provided to the HEVC decoding device 1104 in the HEVC bitstream. The HEVC encoding device 1102 may also send parameter sets, such as a VPS, to the HEVC decoding device 1104 with information allowing the HEVC decoding device 1104 to properly decode the encoded video bitstream. The information may include video signal information, as described below.

Figure 12:
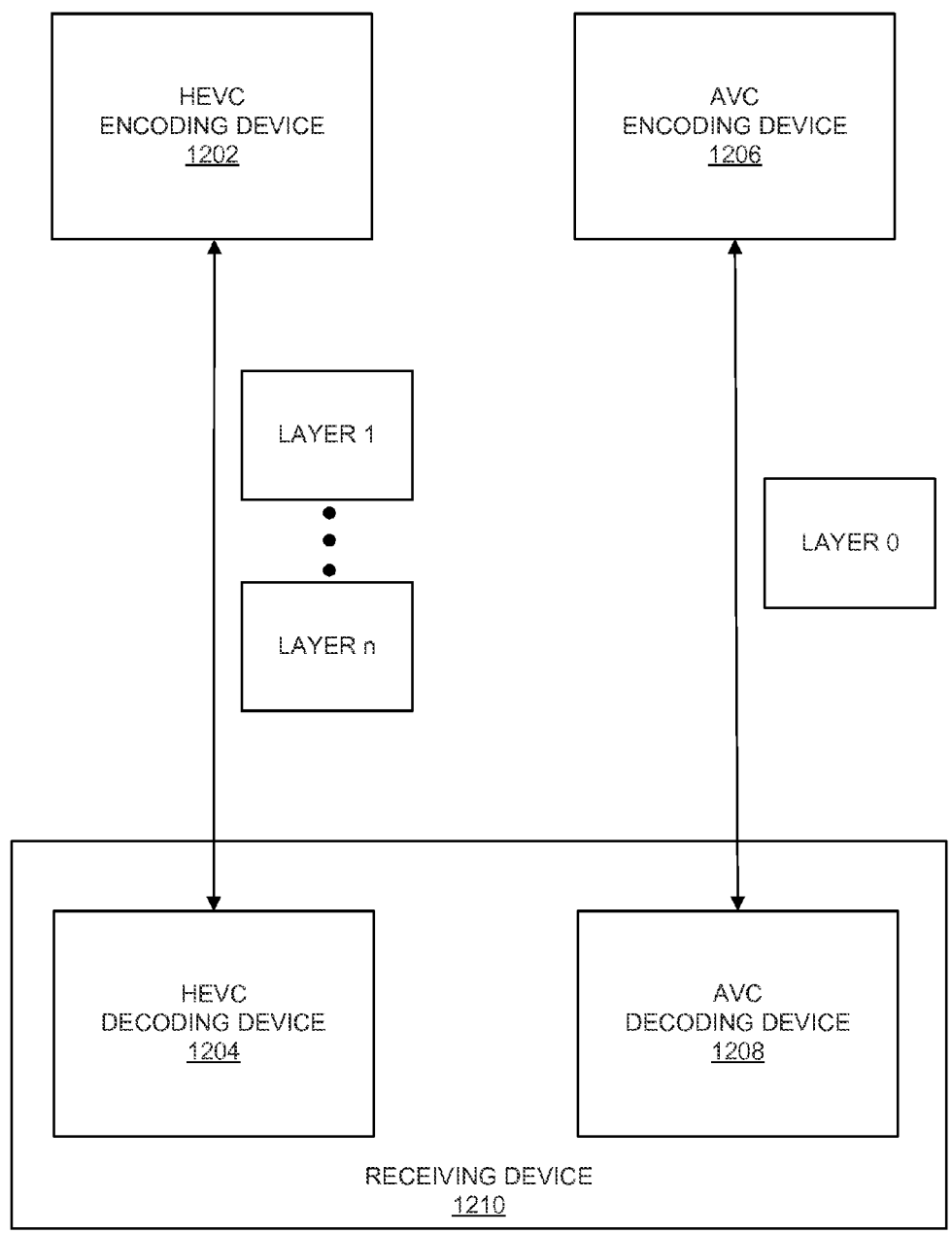
FIG. 12 is a block diagram illustrating an environment with multiple encoding devices for providing encoded video data with multiple layers, in accordance with some embodiments.

FIG. 12 illustrates an example environment 1200 in which an encoding device generates various enhancement layers of an encoded video bitstream, but not a base layer. The environment 1200 includes an HEVC encoding device 1202 and an AVC encoding device 1206 that generate encoded video bitstreams using different video coding standards. One of ordinary skill in the art will appreciate that the techniques described herein apply to other encoding devices that may use different coding standards than HEVC or AVC. The HEVC encoding device 1202 may generate an HEVC compliant video bitstream that includes one or more enhancement layers but no base layer. For example, the HEVC encoding device 1202 may generate enhancement layer 1 to layer n. The AVC encoding device 1206 may generate an AVC compliant video bitstream that includes only a base layer, including base layer 0. When the HEVC encoding device 1202 generates the one or more enhancement layers, the base layer generated by the AVC encoding device 1206 may be used for inter-layer prediction reference.

In one example, the HEVC decoding device 1204 may receive the enhancement layers from the HEVC encoding device 1202, and the AVC decoding device 1208 may receive the base layer from the AVC encoding device 1206. In another example, a first network entity (e.g., an editor or splicer) may splice the enhancement layers from the HEVC encoding device 1202 together with the base layer from the AVC encoding device 1206. The first network entity may perform the splicing in a timely synchronous manner with system time information being added (e.g. in a file format according to the ISO base media file format). A second network entity (e.g., a receiver, such as receiving device 1210, a file format parser, or other network entity) may pass the bitstream of the one or more enhancement layers to the HEVC decoding device 1204 and the bitstream of the base layer to the AVC decoding device 1208. In either example, the bitstream of the base layer is not provided to the HEVC decoding device 1204. Instead, the decoded pictures of the base layer are provided to the HEVC decoding device 1204 (from the AVC decoding device 1208) for inter-layer prediction reference. From the point of view of the HEVC decoding device 1204, the base layer is externally provided by an external source. In some embodiments, the HEVC decoding device 1204 and the AVC decoding device 1208 are separate decoders. In some embodiments, the HEVC decoding device 1204 and the AVC decoding device 1208 are part of a multi-standard decoder that can decode HEVC and AVC bitstreams.

An HEVC encoding device may provide a video parameter set (VPS) with an HEVC compliant video bitstream (e.g., in one or more non-VCL NAL units). A video signal information syntax structure is signaled in the VPS for each layer of a multi-layer encoded video bitstream, with a separate video signal information syntax structure being signaled for each layer. The video signal information syntax structures may be signaled in the VPS VUI of the VPS extension, and can be used to prepare the decoded video for output and display. Video signal information contained in a video signal information syntax structure may include color characteristics, such as color primaries, transfer characteristics, used color conversion matrix coefficients, or other suitable color information. Video signal information may also include video signal type information indicating the original format of the source video (e.g., NTSC, PAL, component, SECAM, MAC, unspecified, or other suitable video format) and, in some cases, a corresponding color format definition and format specification. In some cases, the video signal information may indicate locations of chroma samples in relation to locations of luma samples, which can be used to present a correct color presentation during display.

Figure 13:
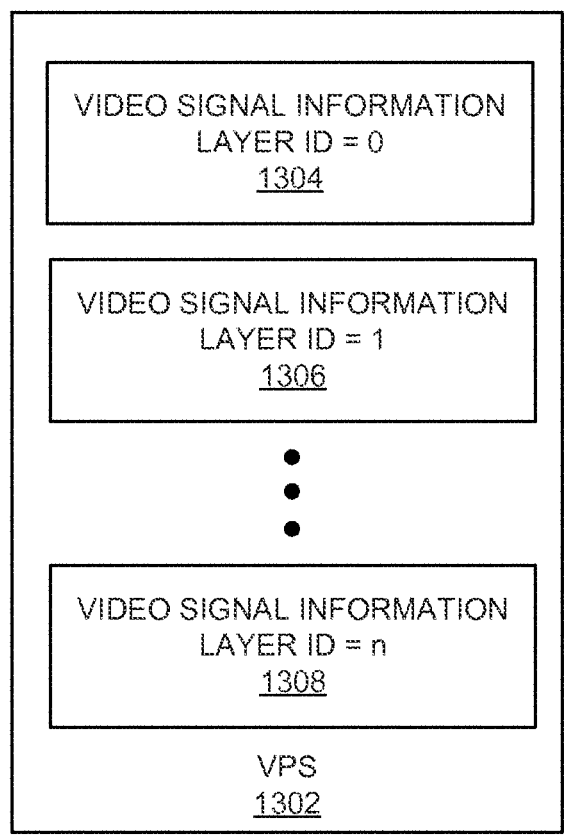
FIG. 13 is an example of a parameter set with video signal information for multiple layers of encoded video data, in accordance with some embodiments.

FIG. 13 illustrates an example of a VPS 1302 that can be sent by an HEVC encoding device along with the HEVC compliant video bitstream. The VPS 1302 includes video signal information for multiple layers of an encoded video bitstream. The video signal information may be contained in one or more video signal information syntax structures of a VPS VUI portion of the VPS 1302. For example, the VPS 1302 includes a video signal information syntax structure 1304 for a layer with layer ID=0 (corresponding to a base layer), a video signal information syntax structure 1306 for an enhancement layer with layer ID=1, and a video signal information syntax structure 1308 for an enhancement layer with layer ID=n.

In some cases, a number of video signal information syntax structures to include (or that is included) in the VPS 1302 is not explicitly signaled. For example, a syntax element (e.g., vps_num_video_signal_info_minus1) that indicates the number of video signal information syntax structures to include in the VPS 1302 may not be present. In such cases, the number of video signal information syntax structures to include in the VPS 1302 is inferred to be equal to the total number of layers in the bitstream (regardless of whether the base layer is provided externally or included in the HEVC encoded video bitstream), leading to one video signal information syntax structure being signaled for each layer ID value, and each layer being assigned to a signaled video signal information syntax structure according to its layer ID value. When the base layer is provided externally (e.g., by an AVC encoding device, as shown in FIG. 12), a signal information structure syntax structure is sent that is useless with respect to the HEVC decoder because the HEVC decoder does not need the signal information syntax structure for the base layer.

Techniques are described for updating the signaling of the video signal information syntax structures in the VPS (e.g., in the VPS VUI) to more efficiently provide data in the VPS. For example, a number of video signal information syntax structures to signal in the VPS is determined based on whether the base layer is included in the encoded video bitstream or to be provided to an HEVC decoding device from an external source. The signaling of the video signal information in the VPS may be updated when the number of video signal information syntax structures in the VPS VUI is not signaled explicitly (e.g., when a syntax element, such as vps_num_video_signal_info_minus1, is not present in the VPS or VPS VUI). For example, the number of video signal information syntax structures signaled in the VPS is inferred to be equal to the maximum number of layers of the bitstream if the base layer is in the HEVC bitstream (not provided externally as shown in FIG. 11). In embodiments in which the base layer is provided externally (as shown in FIG. 12), the number of video signal information syntax structures signaled in the VPS is inferred to be equal to the maximum number of layers of the bitstream minus one. Accordingly, when the base layer is provided from an external source, the number of video signal information syntax structures in the VPS is reduced by one.

In some embodiments, the layer IDs of the layers are mapped to video signal information syntax structures in an index to indicate which syntax structures will apply to the different layers. In such embodiments, when the number of video signal information syntax structures in the VPS is not signaled explicitly, the mapping between layer ID to the index of video signal information syntax structures is updated so that no video signal information syntax structure is assigned to the base layer. Accordingly, a video signal information syntax structure is assigned to each of the layers included in the HEVC encoded video bitstream, and no video signal information syntax structure is assigned to the base layer that is to be provided to the decoder from the external source.

Changes to the HEVC standard to implement the above-described techniques for updating the signaling of the video signal information syntax structures in the VPS may include:

video_signal_info_idx_present_flag equal to 1 specifies that the syntax elements vps_num_video_signal_info_minus1, and vps_video_signal_info_idx[i] are present. video_signal_info_idx_present_flag equal to 0 specifies that the syntax elements vps_num_video_signal_info_minus1, and vps_video_signal_info_idx[i] are not present.

vps_num_video_signal_info_minus1 plus 1 specifies the number of the following video_signal_info( ) syntax structures in the VPS. When not present, the value of vps_num_video_signal_info_minus1 is inferred to be equal to MaxLayersMinus1−(vps_base_layer_internal_flag? 0:1).

vps_video_signal_info_idx[i] specifies the index, into the list of video_signal_info( ) syntax structures in the VPS, of the video_signal_info( ) syntax structure that applies to the layer with nuh_layer_id equal to layer_id_in_nuh[i]. When vps_video_signal_info_idx[i] is not present, vps_video_signal_info_idx[i] is inferred to be equal to (video_signal_info_idx_present_flag? 0:i). The value of vps_video_signal_info_idx[i] shall be in the range of 0 to vps_num_video_signal_info_minus1, inclusive.

When not present, the value of vps_video_signal_info_idx[i] is inferred as follows:
  If video_signal_info_idx_present_flag is equal to 1, vps_video_signal_info_idx[i] is inferred to be equal to 0.
  Otherwise, vps_video_signal_info_idx[i] is inferred to be equal to i−(vps_base_layer_internal_flag? 0:1 vps_vui_bsp_hrd_present_flag equal to 0 specifies that no bitstream partition HRD parameters are present in the VPS VUI. vps_vui_bsp_hrd_present_flag equal to 1 specifies that bitstream partition HRD parameters are present in the VPS VUI. When not present, vps_vui_bsp_hrd_present_flag is inferred to be equal to 0.

Figure 14:
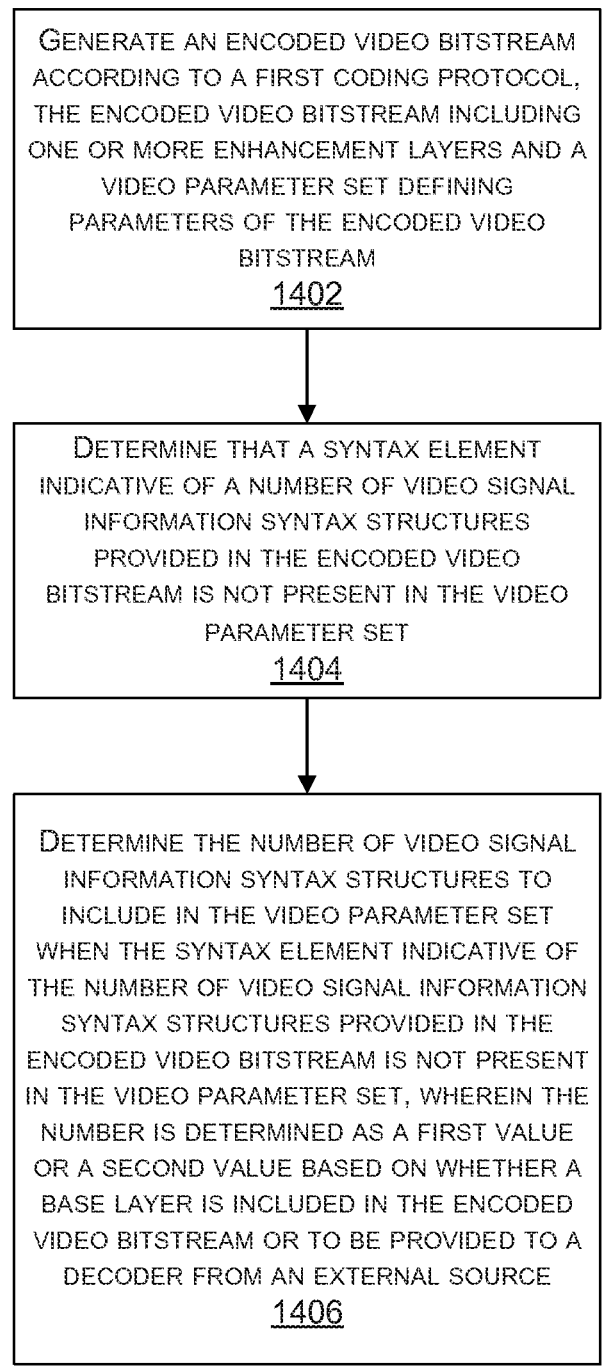
FIG. 14 is a flowchart illustrating an embodiment of a process of encoding video data for selectively signaling different numbers of video signal information syntax structures in a parameter set, in accordance with some embodiments.

FIG. 14 illustrates an embodiment of a process 1400 of encoding video data. The process 1400 is implemented to update the signaling of the video signal information syntax structures in the VPS by selectively signaling different numbers of video signal information syntax structures in the VPS. In some aspects, the process 1400 may be performed by a computing device or an apparatus, such as the encoding device 104 shown in FIG. 1 or in FIG. 16. For example, the computing device or apparatus may include an encoder, or a processor, microprocessor, microcomputer, or other component of an encoder that is configured to carry out the steps of process 1400.

Process 1400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1402, the process 1400 of encoding video data includes generating an encoded video bitstream according to a first coding protocol. The encoded video bitstream includes one or more enhancement layers and a video parameter set defining parameters of the encoded video bitstream. In some embodiments, the encoded video bitstream may be encoded using an HEVC coding technique, or other suitable coding technique.

At 1404, the process 1400 includes determining that a syntax element indicative of a number of video signal information syntax structures provided in the encoded video bitstream is not present in the video parameter set. For example, an encoder may determine that a syntax element (e.g., vps_num_video_signal_info_minus1) that indicates the number of video signal information syntax structures to include in the video parameter set is not present in the video parameter set (e.g., the VPS or VPS VUI).

At 1406, the process 1400 includes determining the number of video signal information syntax structures to include in the video parameter set when the syntax element indicative of the number of video signal information syntax structures provided in the encoded video bitstream is not present in the video parameter set. The number is determined as a first value or a second value based on whether a base layer is included in the encoded video bitstream or to be provided to a decoder from an external source. In some embodiments, the number of video signal information syntax structures to include in the video parameter set is determined as the first value when it is determined that the base layer is included in the encoded video bitstream, in which case the first value is equal to a maximum number of layers of the encoded video bitstream.

In some embodiments, the number of video signal information syntax structures to include in the video parameter set is determined as the second value when it is determined that the base layer is to be provided to the decoder from the external source, in which case the second value is equal to a maximum number of layers of the encoded video bitstream minus one. In some embodiments, a video signal information syntax structure is assigned to each of the layers included in the encoded video bitstream, and no video signal information syntax structure is assigned to the base layer that is to be provided to the decoder from the external source. In some embodiments, the base layer provided from the external source is encoded according to a second coding protocol, the second coding protocol being different than the first coding protocol. In some examples, the first coding protocol includes a high efficiency video coding protocol, and the second coding protocol includes an advanced video coding protocol.

Figure 15:
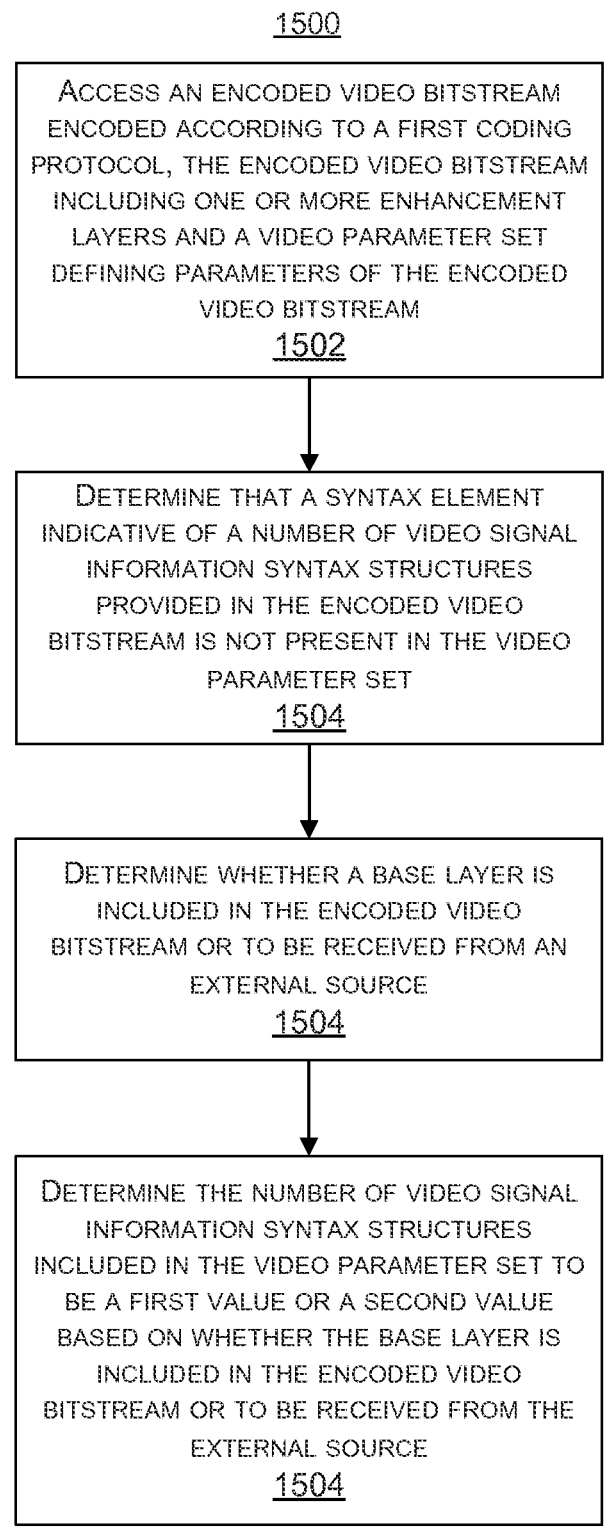
FIG. 15 is a flowchart illustrating an embodiment of a process of decoding video data for inferring different numbers of video signal information syntax structures in a parameter set, in accordance with some embodiments.

FIG. 15 illustrates an embodiment of a process 1500 of decoding video data. The process 1500 is implemented to infer a number of video signal information syntax structures in the VPS. In some aspects, the process 1500 may be performed by a computing device or an apparatus, such as the decoding device 112 shown in FIG. 1 or in FIG. 17. For example, the computing device or apparatus may include a decoder, or a processor, microprocessor, microcomputer, or other component of an decoder that is configured to carry out the steps of process 1500.

Process 1500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1502, the process 1500 of decoding video data includes accessing an encoded video bitstream encoded according to a first coding protocol. The encoded video bitstream includes one or more enhancement layers and a video parameter set defining parameters of the encoded video bitstream. In some embodiments, the encoded video bitstream may be encoded using an HEVC coding technique, or other suitable coding technique.

At 1504, the process 1500 includes determining that a syntax element indicative of a number of video signal information syntax structures provided in the encoded video bitstream is not present in the video parameter set. For example, a decoder may determine that a syntax element (e.g., vps_num_video_signal_info_minus1) that indicates the number of video signal information syntax structures to include in the video parameter set is not present in the video parameter set. At 1506, the process 1500 includes determining whether a base layer is included in the encoded video bitstream or to be received from an external source. For example, the determination of whether a base layer is included in the encoded video bitstream or to be received from an external source may be based on an indication provided to a decoder. The indication may be conveyed through a syntax element of the VPS. In one example, a syntax structure of the VPS may include a flag with a value (e.g., 1 or 0) indicating to the decoder that the base layer is included in the encoded video bitstream. In another example, a syntax structure of the VPS may include a flag with a value (e.g., 1 or 0) indicating to the decoder that the base layer is to be received from an external source.

At 1508, the process 1500 includes determining the number of video signal information syntax structures included in the video parameter set to be a first value or a second value based on whether the base layer is included in the encoded video bitstream or to be received from the external source. In some embodiments, the process 1500 includes determining the number of video signal information syntax structures to be the first value when it is determined that the base layer is included in the encoded video bitstream, in which case the first value is equal to a maximum number of layers of the encoded video bitstream.

In some embodiments, the process 1500 includes determining the number of video signal information syntax structures to be the second value when it is determined that the base layer is to be received from the external source, in which case the second value is equal to a maximum number of layers of the encoded video bitstream minus one. In some embodiments, a video signal information syntax structure is assigned to each of the layers included in the encoded video bitstream, and no video signal information syntax structure is assigned to the base layer that is to be received from the external source. In some embodiments, the base layer provided from the external source is encoded according to a second coding protocol, the second coding protocol being different than the first coding protocol. In some examples, the first coding protocol includes a high efficiency video coding protocol, and wherein the second coding protocol includes an advanced video coding protocol.

The above-described techniques prevent signaling of superfluous video signal information syntax structures when the base layer is provided by an external source. Signaling of such information even when the base layer is encoded according to a separate protocol leads to inefficiencies because the extra video signal information syntax structures are not needed.

The coding techniques discussed herein may be implemented in an example video encoding and decoding system (e.g., system 100). A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 16:
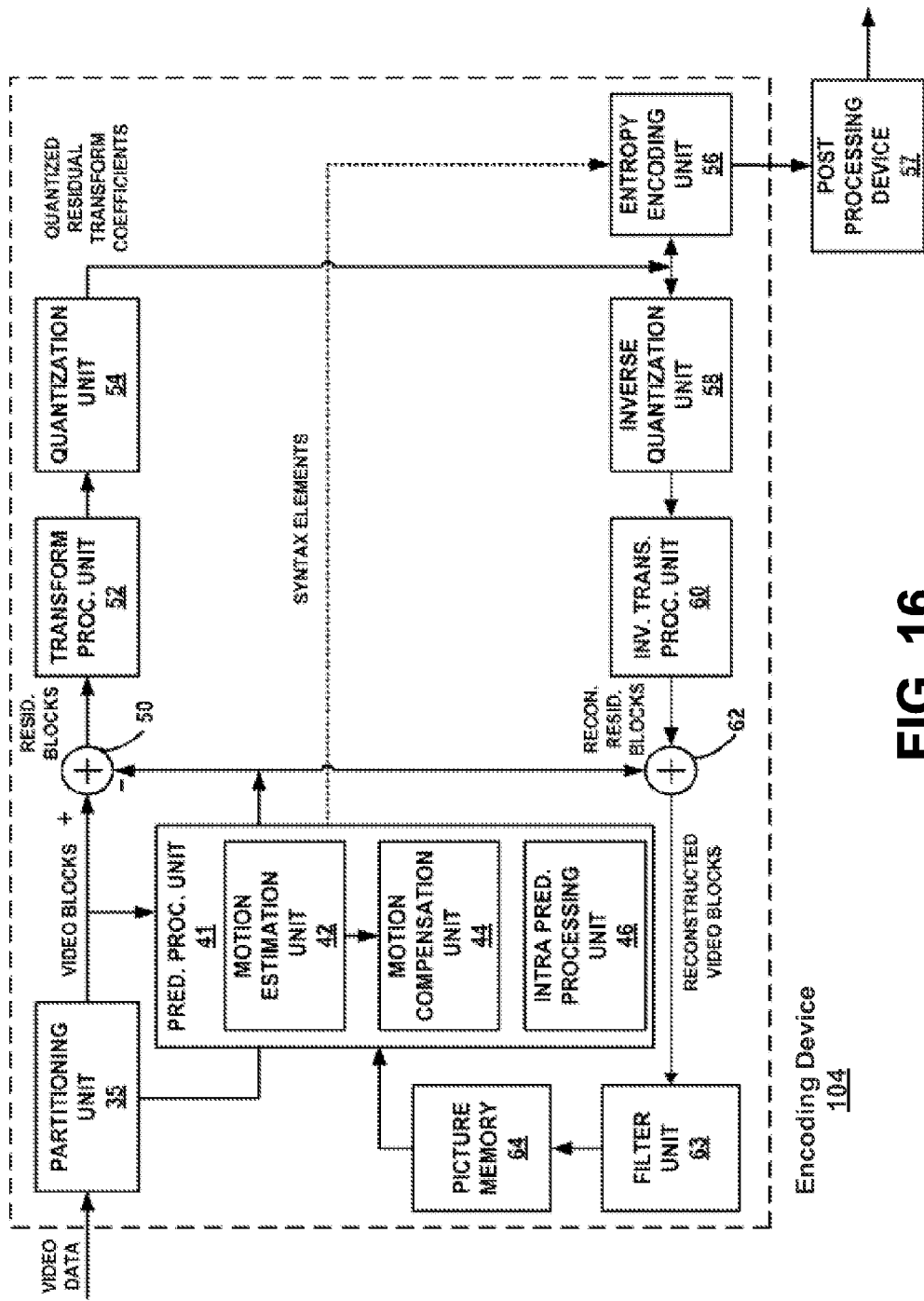
FIG. 16 is a block diagram illustrating an example video encoding device, in accordance with some embodiments.
Figure 17:
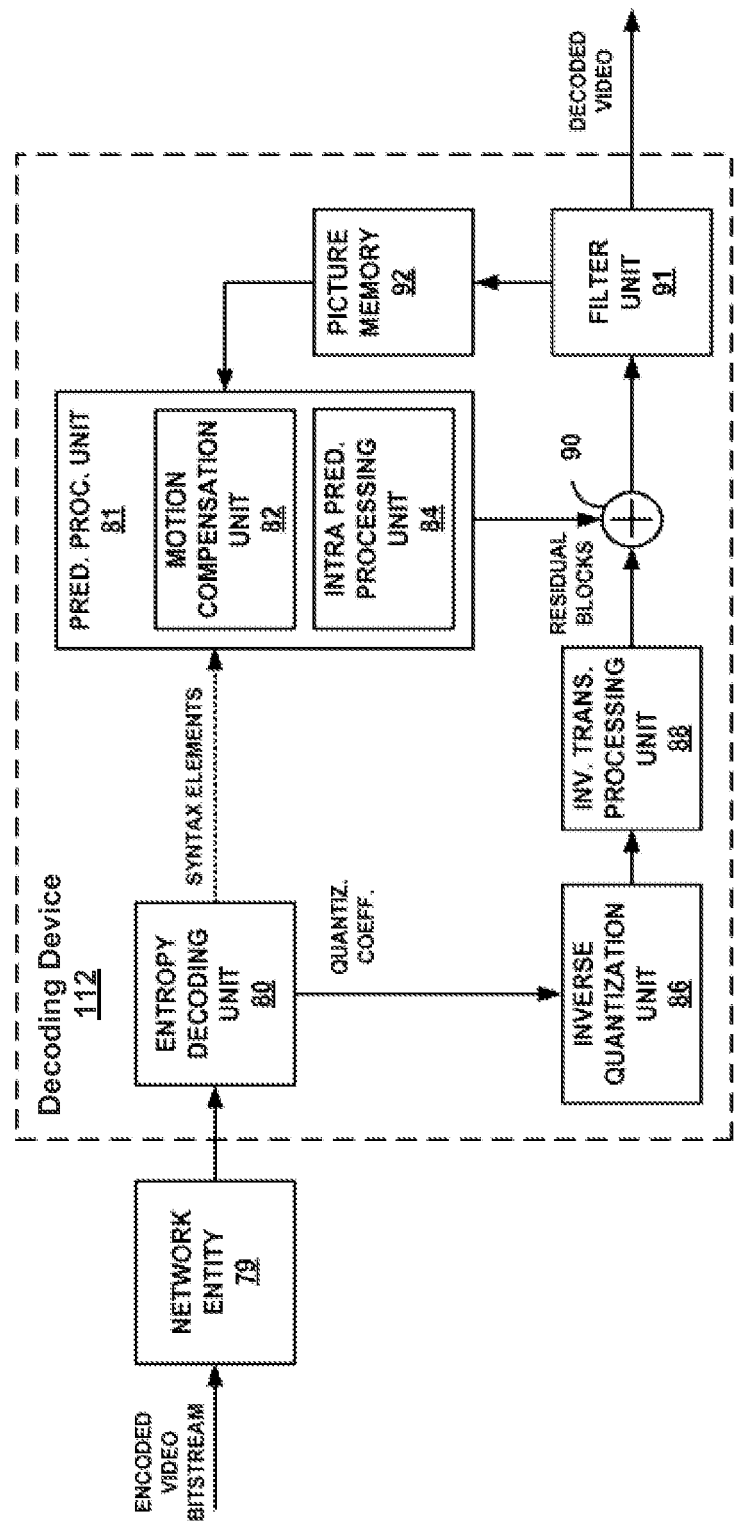
FIG. 17 is a block diagram illustrating an example video decoding device, in accordance with some embodiments.

Specific details of the encoding device 104 and the decoding device 112 are shown in FIG. 16 and FIG. 17, respectively. FIG. 16 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 16 as being an in loop filter, in other configurations, filter unit 63 may be implemented as a post loop filter. A post processing device 57 may perform additional processing on encoded video data generated by encoding device 104. The techniques of this disclosure may in some instances be implemented by encoding device 104. In other instances, however, one or more of the techniques of this disclosure may be implemented by post processing device 57.

As shown in FIG. 16, encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. Encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 104 may calculate values for sub-integer pixel positions of reference pictures stored in picture memory 64. For example, encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 112, or archived for later transmission or retrieval by decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 104 of FIG. 16 represents an example of a video encoder configured to generate syntax for a encoded video bitstream. Encoding device 104 may, for example, generate VPS, SPS, and PPS parameter sets as described above. The encoding device 104 may perform any of the techniques described herein, including the processes described above with respect to FIGS. 7, 8, 10, 14, and 15. The techniques of this disclosure have generally been described with respect to encoding device 104, but as mentioned above, some of the techniques of this disclosure may also be implemented by post processing device 57.

FIG. 17 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Decoding device 112 may, in some examples, perform a decoding pass generally reciprocal to the encoding pass described with respect to encoding device 104 from FIG. 16.

During the decoding process, decoding device 112 receives an encoded video bitstream that represents video blocks of an encoded video slice and associated syntax elements sent by encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include encoding device 104. Some of the techniques described in this disclosure may be implemented by network entity 79 prior to network entity 79 transmitting the encoded video bitstream to decoding device 112. In some video decoding systems, network entity 79 and decoding device 112 may be parts of separate devices, while in other instances, the functionality described with respect to network entity 79 may be performed by the same device that comprises decoding device 112.

The entropy decoding unit 80 of decoding device 112 entropy decodes the bitstream to generate quantized coefficients, motion vectors, and other syntax elements. Entropy decoding unit 80 forwards the motion vectors and other syntax elements to prediction processing unit 81. Decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 104 during encoding of the video blocks to calculate interpolated values for sub-integer pixels of reference blocks. In this case, motion compensation unit 82 may determine the interpolation filters used by encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 17 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data, the method comprising:
    generating an encoded video bitstream comprising a base layer and one or more enhancement layers, the encoded video bitstream including a video parameter set (VPS) defining parameters of the encoded video bitstream, wherein parameters of the base layer are defined in a base part of the VPS and parameters of the one or more enhancement layers are defined in at least a VPS extension part of the VPS, and wherein the VPS extension part of the VPS includes a video usability information (VUI) applying to the one or more enhancement layers;
    determining whether timing information is signaled in the VPS; and
    determining whether to signal hypothetical reference decoder parameters in the VUI of the VPS extension part of the VPS based on whether timing information is signaled in the VPS.

2. The method of claim 1, further comprising signaling the hypothetical reference decoder parameters in the VUI of the VPS extension part of the VPS when timing information is signaled in the VPS video usability information.

3. The method of claim 1, further comprising not signaling the hypothetical reference decoder parameters in the VUI of the VPS extension part of the VPS when timing information is not signaled in the VPS.

4. The method of claim 1, wherein determining whether the timing information is signaled in the VPS includes determining a value of a first flag in the VPS, the first flag indicating whether the timing information is signaled in the VPS.

5. The method of claim 4, further comprising determining a value of a second flag in the VUI of the VPS extension part of the VPS based on the value of the first flag, the second flag defining whether hypothetical reference decoder parameters are signaled in the VUI of the VPS extension part of the VPS.

6. The method of claim 5, further comprising providing, in the VUI of the VPS extension part of the VPS, one or more syntax elements for signaling information related to the encoded video bitstream, the information including a condition that the value of the second flag is dependent on the value of the first flag.

7. The method of claim 5, further comprising providing, in the VUI of the VPS extension part of the VPS, one or more syntax elements for signaling information related to the encoded video bitstream, the information including a constraint that the value of the second flag is to be set to zero when the value of the first flag is equal to zero.

8. The method of claim 1, the method being executable on a wireless communication device, wherein the device comprises:
a memory configured to store the video data;
a processor configured to execute instructions to process the video data stored in the memory; and
a transmitter configured to transmit the encoded video bitstream including the VPS.

9. The method of claim 8, wherein the wireless communication device is a cellular telephone and the encoded video bitstream is modulated according to a cellular communication standard.

10. An apparatus comprising:
a memory configured to store video data; and
a processor configured to:
generate, from the video data, an encoded video bitstream comprising a base layer and one or more enhancement layers, the encoded video bitstream including a video parameter set (VPS) defining parameters of the encoded video bitstream, wherein parameters of the base layer are defined in a base part of the VPS and parameters of the one or more enhancement layers are defined in at least a VPS extension part of the VPS, and wherein the VPS extension part of the VPS includes a video usability information (VUI) applying to the one or more enhancement layers;
determine whether timing information is signaled in the VPS; and
determine whether to signal hypothetical reference decoder parameters in the VUI of the VPS extension part of the VPS based on whether timing information is signaled in the VPS.

11. The apparatus of claim 10, wherein the processor is configured to signal the hypothetical reference decoder parameters in the VUI of the VPS extension part of the VPS when timing information is signaled in the VPS.

12. The apparatus of claim 10, wherein the processor is configured to determine not to signal the hypothetical reference decoder parameters in the VUI of the VPS extension part of the VPS when timing information is not signaled in the VPS.

13. The apparatus of claim 10, wherein determining whether the timing information is signaled in the VPS includes determining a value of a first flag in the VPS, the first flag indicating whether the timing information is signaled in the VPS.

14. The apparatus of claim 13, wherein the processor is configured to determine a value of a second flag in the VUI of the VPS extension part of the VPS based on the value of the first flag, the second flag defining whether hypothetical reference decoder parameters are signaled in the VUI of the VPS extension part of the VPS.

15. The apparatus of claim 14, wherein the processor is configured to provide, in the VUI of the VPS extension part of the VPS, one or more syntax elements for signaling information related to the encoded video bitstream, the information including a condition that the value of the second flag is dependent on the value of the first flag.

16. The apparatus of claim 14, wherein the processor is configured to provide, in the VUI of the VPS extension part of the VPS, one or more syntax elements for signaling information related to the encoded video bitstream, the information including a constraint that the value of the second flag is to be set to zero when the value of the first flag is equal to zero.

17. The apparatus of claim 10, wherein the apparatus is a wireless communication device, further comprising:
a transmitter configured to transmit the encoded video bitstream including the VPS.

18. The apparatus of claim 17, wherein the wireless communication device is a cellular telephone and the encoded video bitstream is modulated according to a cellular communication standard.

19. A non-transitory computer readable medium having stored thereon instructions that, when executed by one or more processors, cause the one or more processors to:
generate an encoded video bitstream comprising a base layer and one or more enhancement layers, the encoded video bitstream including a video parameter set (VPS) defining parameters of the encoded video bitstream, wherein parameters of the base layer are defined in a base part of the VPS and parameters of the one or more enhancement layers are defined in at least a VPS extension part of the VPS, and wherein the VPS extension part of the VPS includes a video usability information (VUI) applying to the one or more enhancement layers;
determine whether timing information is signaled in the VPS; and
determine whether to signal hypothetical reference decoder parameters in the VUI of the VPS extension part of the VPS based on whether timing information is signaled in the VPS.

20. The computer readable medium of claim 19, further comprising instructions that, when executed by the one or more processors, cause the one or more processors to signal the hypothetical reference decoder parameters in the VUI of the VPS extension part of the VPS when timing information is signaled in the VPS.

21. The computer readable medium of claim 19, further comprising instructions that, when executed by the one or more processors, cause the one or more processors to not signal the hypothetical reference decoder parameters in the VUI of the VPS extension part of the VPS when timing information is not signaled in the VPS.

22. The computer readable medium of claim 19, wherein determining whether the timing information is signaled in the VPS includes determining a value of a first flag in the VPS, the first flag indicating whether the timing information is signaled in the VPS.

23. The computer readable medium of claim 22, further comprising instructions that, when executed by the one or more processors, cause the one or more processors to determine a value of a second flag in the VUI of the VPS extension part of the VPS based on the value of the first flag, the second flag defining whether hypothetical reference decoder parameters are signaled in the VUI of the VPS extension part of the VPS.

24. An apparatus comprising:
means for generating an encoded video bitstream comprising a base layer and one or more enhancement layers, the encoded video bitstream including a video parameter set (VPS) defining parameters of the encoded video bitstream, wherein parameters of the base layer are defined in a base part of the VPS and parameters of the one or more enhancement layers are defined in at least a VPS extension part of the VPS, and wherein the VPS extension part of the VPS includes a video usability information (VUI) applying to the one or more enhancement layers;

means for determining whether timing information is signaled in the VPS; and means for determining whether to signal hypothetical reference decoder parameters in the VUI of the VPS extension part of the VPS based on whether timing information is signaled in the VPS.

25. The apparatus of claim 24, wherein the hypothetical reference decoder parameters are signaled in the VUI of the VPS extension part of the VPS when timing information is signaled in the VPS.

26. The apparatus of claim 24, wherein the hypothetical reference decoder parameters are not signaled in the VUI of the VPS extension part of the VPS when timing information is not signaled in the VPS.

27. The apparatus of claim 24, wherein determining whether the timing information is signaled in the VPS includes determining a value of a first flag in the VPS, the first flag indicating whether the timing information is signaled in the VPS.

28. The apparatus of claim 27, further comprising means for determining a value of a second flag in the VUI of the VPS extension part of the VPS based on the value of the first flag, the second flag defining whether hypothetical reference decoder parameters are signaled in the VUI of the VPS extension part of the VPS.

29. The apparatus of claim 28, further comprising means for providing, in the VUI of the VPS extension part of the VPS, one or more syntax elements for signaling information related to the encoded video bitstream, the information including a condition that the value of the second flag is dependent on the value of the first flag.

30. The apparatus of claim 28, further comprising means for providing, in the VUI of the VPS extension part of the VPS, one or more syntax elements for signaling information related to the encoded video bitstream, the information including a constraint that the value of the second flag is to be set to zero when the value of the first flag is equal to zero.

* * * * *

UNITED STATES PATENT AND TRADEMARK OFFICE
CERTIFICATE OF CORRECTION

PATENT NO.        : 9,930,342 B2                                    Page 1 of 1
APPLICATION NO.   : 14/743556
DATED             : March 27, 2018
INVENTOR(S)       : Ye-Kui Wang et al.

It is certified that error appears in the above-identified patent and that said Letters Patent is hereby corrected as shown below:

Column 46, Claim 2, Line 4:
Replace "signaled in the VPS video usability information." with --signaled in the VPS.--

Signed and Sealed this
Tenth Day of July, 2018

Andrei Iancu
*Director of the United States Patent and Trademark Office*